US012639884B2

(12) United States Patent
Shao et al.

(10) Patent No.: US 12,639,884 B2
(45) Date of Patent: May 26, 2026

(54) 3D MODEL RENDERING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Yuewei Shao, Shenzhen (CN); Yixin Hu, Shenzhen (CN); Jinzhao Zhan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 18/593,743

(22) Filed: Mar. 1, 2024

(65) Prior Publication Data

US 2024/0203030 A1     Jun. 20, 2024

Related U.S. Application Data

(63) Continuation of application No. PCT/CN2023/097696, filed on Jun. 1, 2023.

(30) Foreign Application Priority Data

Aug. 19, 2022     (CN) .......................... 202210996952.8

(51) Int. Cl.
*G06T 15/04*     (2011.01)
*G06T 17/00*     (2006.01)
(52) U.S. Cl.
CPC .............. *G06T 15/04* (2013.01); *G06T 17/00* (2013.01)
(58) Field of Classification Search
CPC ......... G06T 15/04; G06T 19/20; G06T 15/08; G06T 17/00; G06T 2219/2004;
(Continued)

(56) References Cited

U.S. PATENT DOCUMENTS

2006/0114254 A1* 6/2006 Day ........................ G06T 15/08
                                                     345/424
2014/0218360 A1   8/2014 Dalgaard Larson
2018/0012395 A1*  1/2018 Watanabe .............. G06T 15/04

FOREIGN PATENT DOCUMENTS

CN          102385657 A      3/2012
CN          106055794 A     10/2016
                (Continued)

OTHER PUBLICATIONS

Tencent Technology, ISR, PCT/CN2023/097696, Sep. 13, 2023, 2 pgs.

*Primary Examiner* — Hau H Nguyen
(74) *Attorney, Agent, or Firm* — Morgan, Lewis & Bockius LLP

(57)     ABSTRACT

This application discloses a three-dimension (3D) model rendering method performed by an electronic device. The method includes: acquiring a cross-section dataset constructed based on submodels of a 3D model and including cross-section data used for indicating a cross section of an envelope box of at least one submodel; acquiring texture maps corresponding to the cross-section dataset, the texture maps being determined according to texture data of submodels corresponding to the cross-section data; and rendering the 3D model based on the cross-section data in the cross-section dataset and the corresponding texture maps. Since the texture maps are obtained by projecting the texture data of the submodels corresponding to the cross-section data onto cross sections indicated by the cross-section data, the texture maps can reflect textures and shapes of the submodels, so that a rendering effect can be improved based on the cross-section data and the corresponding texture maps.

20 Claims, 11 Drawing Sheets

Acquire a cross-section dataset, the cross-section dataset being constructed based on a plurality of submodels included in a 3D model of an object, the submodels respectively representing components of the object, texture data of the submodels representing texture information of the components, the cross-section dataset including a plurality of pieces of cross-section data, each of the plurality of pieces of cross-section data being used for indicating a cross section of an envelope box of at least one submodel — 201

Acquire texture maps corresponding to the plurality of pieces of cross-section data in the cross-section dataset, any of the texture maps being used for representing texture data obtained by projecting texture data of submodels corresponding to a corresponding piece of cross-section data onto a cross section indicated by the corresponding piece of cross-section data, the corresponding piece of cross-section data being a piece of cross-section data in the plurality of pieces of cross-section data and corresponding to the texture map — 202

Render the 3D model based on the plurality of pieces of cross-section data in the cross-section dataset and the corresponding texture maps — 203

(58) Field of Classification Search
CPC ........... G06T 2219/2021; G06T 11/001; G06T
15/00; G06T 19/00; G06T 2219/008
See application file for complete search history.

(56) References Cited

FOREIGN PATENT DOCUMENTS

| | | | |
|----|------------|---|---------|
| CN | 113239442 | A | 8/2021 |
| CN | 113450441 | A | 9/2021 |
| CN | 113888718 | A | 1/2022 |
| JP | 2005332028 | A | 12/2005 |

* cited by examiner

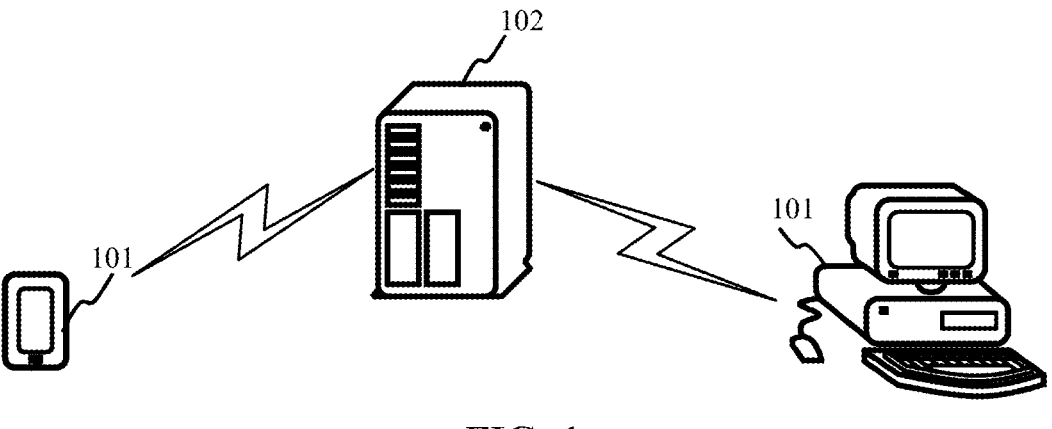

FIG. 1

Acquire a cross-section dataset, the cross-section dataset being constructed based on a plurality of submodels included in a 3D model of an object, the submodels respectively representing components of the object, texture data of the submodels representing texture information of the components, the cross-section dataset including a plurality of pieces of cross-section data, each of the plurality of pieces of cross-section data being used for indicating a cross section of an envelope box of at least one submodel

201

Acquire texture maps corresponding to the plurality of pieces of cross-section data in the cross-section dataset, any of the texture maps being used for representing texture data obtained by projecting texture data of submodels corresponding to a corresponding piece of cross-section data onto a cross section indicated by the corresponding piece of cross-section data, the corresponding piece of cross-section data being a piece of cross-section data in the plurality of pieces of cross-section data and corresponding to the texture map

202

Render the 3D model based on the plurality of pieces of cross-section data in the cross-section dataset and the corresponding texture maps

Level 0

Level 1

Level n

Level n+1

Leaf model (1)

(2)

(1)

(2)

1

3D MODEL RENDERING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2023/097696, entitled "3D MODEL RENDERING METHOD AND APPARATUS, ELECTRONIC DEVICE, AND STORAGE MEDIUM" filed on Jun. 1, 2023, which claims priority to Chinese Patent Application No. 202210996952.8, entitled "3D MODEL RENDERING METHOD AND APPARATUS, ELEC-TRONIC DEVICE, AND STORAGE MEDIUM" filed on Aug. 19, 2022, all of which is incorporated by reference in its entirety.

FIELD OF THE TECHNOLOGY

Embodiments of this application relate to the field of image processing technologies, and in particular, to a three-dimension (3D) model rendering method and apparatus, an electronic device, and a storage medium.

BACKGROUND OF THE DISCLOSURE

With the improvement of computer performance and the development of image processing technologies, objects are generally represented with 3D models. For example, plants are represented with 3D plant models. An electronic device may render 3D models to display objects represented with the 3D models in scenes such as movies, games, and engineering design.

In a related technology, there is a need to first model a 3D model of an object. The 3D model includes a plurality of submodels. The submodels are triangular meshes with texture data. The triangular meshes each include a plurality of triangles. The triangular meshes have a large data volume, which seriously affects rendering efficiency. Therefore, the triangular meshes may be simplified by merging at least two triangles into one triangle, thereby simplifying the submodels to improve the rendering efficiency. A rendering result of the 3D model is obtained by rendering the simplified submodels.

In the above technology, due to the simplification of the triangular meshes, the submodels may be deformed, resulting in a poor rendering effect of the 3D model.

SUMMARY

This application provides a 3D model rendering method and apparatus, an electronic device, and a storage medium to solve the problem of the poor rendering effect of the 3D model in the related technology. The technical solutions include the following content.

According to one aspect, a 3D model rendering method is performed by an electronic device, the method including:

acquiring a cross-section dataset of a 3D model of an object, each of a plurality of pieces of cross-section data in the cross-section dataset corresponding to a cross section of an envelope box of at least one submodel representing a respective component of the object;

acquiring texture maps corresponding to the plurality of pieces of cross-section data in the cross-section dataset; and

rendering the 3D model based on the plurality of pieces of cross-section data in the cross-section dataset and the corresponding texture maps.

According to still another aspect, an electronic device is provided, where the electronic device includes a processor and a memory, the memory storing at least one computer program, and the at least one computer program being loaded and executed by the processor to cause the electronic device to implement any one of the 3D model rendering methods described above.

According to yet another aspect, a non-transitory computer-readable storage medium is provided, where the computer-readable storage medium stores at least one computer program, the at least one computer program being loaded and executed by a processor to cause an electronic device to implement any one of the 3D model rendering methods described above.

The technical solutions provided in this application bring at least the following beneficial effects:

In the technical solutions provided in this application, cross-section data is acquired first, the cross-section data being used for indicating a cross section of an envelope box of at least one submodel, and then a texture map corresponding to the cross-section data is acquired, the texture map corresponding to the cross-section data being determined according to texture data of submodels corresponding to the cross-section data. Since the texture map represents texture data obtained by projecting the texture data of the submodels corresponding to the cross-section data onto a cross section indicated by any piece of cross-section data, shapes of the submodels after projection are not prone to deformation, so that the rendering effect can be improved during rendering based on the cross-section data and the corresponding texture map.

BRIEF DESCRIPTION OF THE DRAWINGS

FIG. 1 is a schematic diagram of an implementation environment of a 3D model rendering method according to an embodiment of this application.

FIG. 2 is a flowchart of a 3D model rendering method according to an embodiment of this application.

DESCRIPTION OF EMBODIMENTS

Figure 3:
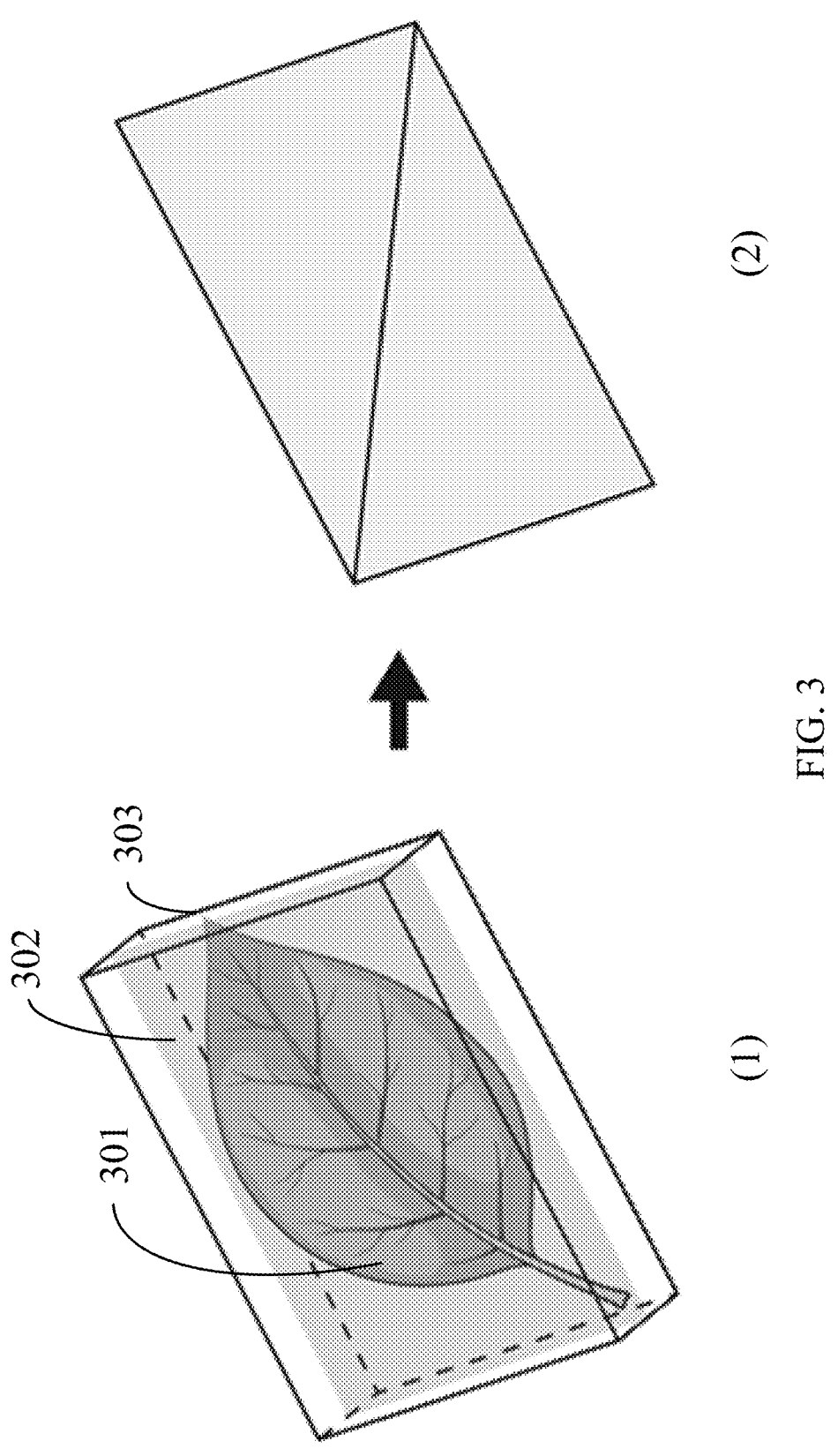
FIG. 3 is a schematic diagram of acquiring cross-section data of a base leaf model according to an embodiment of this application.

FIG. 1 is a schematic diagram of an implementation environment of a 3D model rendering method according to an embodiment of this application. As shown in FIG. 1, the implementation environment includes a terminal device 101 and a server 102. The 3D model rendering method in this embodiment of this application may be performed by the terminal device 101, or by the server 102, or by both the terminal device 101 and the server 102. The terminal device 101 may be a smartphone, a game console, a desktop computer, a wearable device, a tablet computer, a laptop computer, a smart TV, a smart vehicle-mounted device, a smart voice interaction device, a smart home appliance, or the like. The server 102 may be any one of a server, a server cluster formed by a plurality of servers, a cloud computing center, and a virtualization center, which is not limited in this embodiment of this application. The server 102 may be in communication connection with the terminal device 101 by using a wired network or a wireless network. The server 102 may have functions such as data processing, data storage, and data transmitting and receiving, which is not limited in this embodiment of this application. Quantities of the terminal device 101 and the server 102 are not limited, which may be one or more. The technical solution provided in this embodiment of this application may be implemented based on a cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required and is flexible and convenient. A cloud computing technology will become an important support. A backend service of a technical network system requires a large amount of computing and storage resources, such as a video website, an image website, and more portal websites. As the Internet industry is highly developed and applied, each article may have its own ID in the future, which needs to be transmitted to a backend system for logical processing. Data at different levels may be separately processed, and data in various industries requires strong system support, which can only be implemented through cloud computing.

In the field of the image processing technologies, an electronic device renders submodels in a 3D model of an object to display objects represented by the 3D model in scenes such as movies, games, and engineering design. Generally, each submodel of the 3D model is a triangular mesh. The triangular mesh includes a plurality of triangles. Texture data of the submodel may represent texture information of a corresponding component on the object. During rendering of any submodel, part of the triangles of the submodel are merged into a large triangle, thereby simplifying the triangular mesh, that is, simplifying the submodel. The process leads to deformation of the submodel, resulting in a poor rendering effect of the 3D model. An embodiment of this application provides a 3D model rendering method. The method is applicable to the above implementation environment to solve the problem of the poor rendering effect of the 3D model. Taking a flowchart of a 3D model rendering method according to an embodiment of this application shown in FIG. 2 as an example, for the convenience of description, the terminal device 101 or the server 102 that performs the 3D model rendering method in this embodiment of this application is called an electronic device. The method may be performed by the electronic device. As shown in FIG. 2, the method includes step 201 to step 203.

Step 201: Acquire a cross-section dataset, the cross-section dataset being constructed based on a plurality of submodels included in a 3D model of an object, the submodels respectively representing components of the object, texture data of the submodels representing texture information of the components, the cross-section dataset including a plurality of pieces of cross-section data, each of the plurality of pieces of cross-section data being used for indicating a cross section of an envelope box of at least one submodel.

In this embodiment of this application, the electronic device may first acquire the 3D model of the object, and then construct the cross-section dataset based on the submodels included in the 3D model. In this application, the cross-section dataset includes a plurality of pieces of cross-section data, one piece of cross-section data corresponds to at least one submodel, and one submodel corresponds to one component of the object.

Content of the 3D model is described below.

Any object may be modeled by using a 3D model modeling technology, to obtain a 3D model of the object. A modeling manner is not limited in this embodiment of this application. The object may be modeled by using any modeling tool. For example, any plant may be modeled by using a modeling tool (such as Speed Tree), to obtain a 3D model of the plant (referred to as a plant model).

The electronic device may directly acquire the modeled 3D model. The 3D model includes a plurality of submodels. Generally, any object may be regarded as being formed by a plurality of components. A submodel representing any component may be obtained by modeling the component. For example, the plant includes components such as a root, a trunk, a branch, and a leaf. Taking the leaf as an example, the leaf is modeled to obtain a submodel representing the leaf. The submodel representing the leaf may be called a leaf model.

Each submodel has a triangular mesh corresponding thereto. The triangular mesh is a polygonal mesh (referred to as a mesh) in computer graphics. In computer graphics and 3D solid modeling, the polygonal mesh is a collection of vertices, sides, and faces that define a shape of a polyhedral object. The triangular mesh is formed by a set of triangles (generally triangles in a 3D space) connected by common sides or angles. Briefly, the triangular mesh includes a plurality of triangles, and the triangular mesh may represent information such as a shape and an outline of the component corresponding to the submodel.

In this embodiment of this application, the triangular mesh corresponding to the submodel is a triangular mesh with texture data. The triangular mesh is expressed by triangular mesh data and texture images.

Generally, data of vertices in the triangular mesh corresponding to the submodel is recorded in the triangular mesh data corresponding to the submodel. The data of any vertex includes 3D coordinates of the vertex, identification information of the vertex, UV coordinates (i.e., texture coordinates) of the vertex, and the like. In some embodiments, three vertices in the triangular mesh may determine a triangular surface. In addition to the data of the vertices, the triangular mesh data may also include data of the triangular surface. The data of the triangular surface includes at least one of a plane equation of the triangular surface, a straight line equation of a straight line between any two vertices in the triangular surface, a normal vector of the triangular surface, data of vertices in the triangular surface, and the like.

The submodel corresponds to at least one texture image. The texture image includes an albedo map, a normal map, a subsurface scattering map, a position map, and the like. The albedo map corresponding to the submodel may reflect a color and a texture of the submodel. The albedo map corresponding to the submodel is a map obtained by drawing a normal at each point on an uneven surface of the submodel and representing a normal direction with a pixel value. Therefore, the albedo map corresponding to the submodel may reflect the uneven surface of the submodel. The sub-surface scattering map corresponding to the submodel may reflect a visual effect after light shines on a surface of the submodel. A pixel value of any pixel in the position map corresponding to the submodel corresponds to 3D coordinates of a point in the 3D space. Therefore, the position map corresponding to the submodel may reflect a 3D structure of the submodel.

Based on the UV coordinates of each vertex, a texture color value corresponding to the vertex (referred to as a texture value) may be determined. Therefore, the UV coordinates of the vertices in the triangular mesh corresponding to the submodel may reflect the texture information of the component corresponding to the submodel. Moreover, the texture image corresponding to the submodel may also reflect the texture information of the component corresponding to the submodel. Therefore, both the UV coordinates of the vertices and the texture image corresponding to the submodel belong to the texture data corresponding to the submodel.

For example, 3D coordinates of vertices, identification information of the vertices, and texture coordinates of the vertices in a triangular mesh corresponding to the leaf model are recorded triangular mesh data corresponding to the leaf model. Information such as a shape and an outline of the leaf may be represented with the 3D coordinates of the vertices in the triangular mesh. The leaf model further corresponds to an albedo map, a normal map, a subsurface scattering map, and a position map. Texture data of the leaf may be represented with the maps and the texture coordinates of the vertices in the triangular mesh.

The content of the 3D model is described above. As can be seen from the above, the 3D model includes a plurality of submodels. In this embodiment of this application, the electronic device may determine a piece of cross-section data based on at least one submodel. In this manner, pieces of cross-section data in the cross-section dataset can be determined based on the plurality of submodels. The piece of cross-section data is used for indicating a cross section of an envelope box of at least one submodel. Since the sub-model belongs to the 3D model, the envelope box is a 3D geometry. In some embodiments, the envelope box is a polyhedron, and the cross section is any cross section of the polyhedron. A shape of the cross section is not limited in this embodiment of this application. For example, the cross section is a quadrilateral, a triangle, a hexagon, or the like. For example, the piece of cross-section data is used for indicating at least one of 3D coordinates of pixels of the cross section of the envelope box of the at least one submodel, a normal vector of the cross section, and a plane equation of the cross section.

In some embodiments, the envelope box is a minimum cuboid that surrounds the at least one submodel. In this case, the cross section may be a cross section passing through a center of the minimum cuboid. In other words, the piece of cross-section data is used for indicating a cross section of the minimum cuboid that surrounds the at least one submodel, and the cross section passes through the center of the minimum cuboid. In some embodiments, the cross section indicated by the piece of cross-section data is formed by triangular surfaces located on a same plane. For example, the cross section of the minimum cuboid is a rectangle, the cuboid is formed by two triangular surfaces, and the two triangular surfaces are located on a same plane.

One possible implementation of step 201 includes an implementation A as shown below.

In the implementation A, the cross-section dataset includes at least two levels of datasets, the dataset at any level includes at least one piece of cross-section data, and one piece of cross-section data at a higher level corresponds to at least one piece of cross-section data at a lower level.

The at least two levels of datasets belong to a levels of detail (LOD) data structure. Since one piece of cross-section data at the higher level corresponds to at least one piece of cross-section data at the lower level, an amount of cross-section data included in the dataset at the higher level is less than that of cross-section data included in the dataset at the lower level.

In this embodiment of this application, a LOD of any level is related to an amount of cross-section data included in the dataset at the level. If the dataset at any level includes a larger amount of cross-section data, the LOD of the level is finer (i.e., higher). If the dataset at any level includes a smaller amount of cross-section data, the LOD of the level is coarser (i.e., lower). Since the amount of the cross-section data included in the dataset at the higher level is less than that of the cross-section data included in the dataset at the lower level, the LOD of the higher level is lower than that of the lower level.

In the implementation A, the method further includes step 2011 to step 2012 before step 201.

Step 2011: Determine a dataset at a higher level based on a dataset at a lower level, the dataset at the lower level being determined based on the cross-section data corresponding to the submodels in the 3D model in response to the lower level being the lowest level in the at least two levels.

In this embodiment of this application, cross-section data corresponding to the submodels in the 3D model may be determined first, and the cross-section data corresponding to the submodels in the 3D model is taken as pieces of cross-section data in the dataset at the lowest level in the at least two levels. Alternatively, the cross-section data corresponding to the submodels in the 3D model is aggregated to obtain the dataset at the lowest level in the at least two levels. An aggregation manner may be obtained with reference to the following description of step B1, which is not described in detail herein. Next, from the lowest level, the at least two levels of datasets may be obtained by determining the dataset at the higher level based on the dataset at the lower level. That is, the cross-section dataset includes cross-section data at the lowest level and aggregated cross-section data, the cross-section data at the lowest level is in one-to-one correspondence to the submodels, and the aggregated cross-section data corresponds to the plurality of submodels.

A manner of determining the dataset at the lowest level is introduced below.

In a possible implementation, the cross-section data corresponding to the submodels in the 3D model may be determined by step A1 to step A3 as shown below, to obtain the dataset at the lowest level.

Step A1: Determine a basic submodel in the 3D model, the basic submodel being any of the submodels in the 3D model; and determine transformation information from the basic submodel to another submodel, the another submodel being any of the submodels in the 3D model other than the basic submodel.

During the obtaining of the 3D model by modeling, a set quantity of submodels may be first modeled. The submodels may be called basic submodels. Through 3D affine transformation, the basic submodels are transformed to obtain other submodels. For example, for the plant model, when a quantity of leaf models in the plant model is greater than a quantity threshold, which indicates that the plant model includes a larger quantity of leaf models, a set quantity of leaf models may be modeled. Such leaf models are taken as base leaf models (i.e., basic submodels), and the base leaf models are transformed to obtain other leaf models.

Generally, during the modeling of the 3D model, each time a basic submodel is modeled, a triangular mesh (i.e., triangular mesh data and at least one texture image) corresponding to the basic submodel may be stored in a set storage space. Each time the basic submodel is transformed to obtain another submodel, transformation information may be stored in the storage space, so as to record the transformation by using the transformation information. Therefore, in addition to corresponding to the triangular mesh, the basic submodel also corresponds to a transformation file. The transformation file records transformation information from the basic submodel to a plurality of other submodels.

In some embodiments, the transformation information includes at least one of translation information, zooming information, and rotation information. Transformation information of transformation from the basic submodel to any of the other submodels is formed by 8 data segments whose data type is a floating-point number. The floating-point number is a data type including both a decimal and an integer. The translation information corresponds to 3 data segments whose data type is a floating-point number, which are used for recording translation transformation. The zooming information corresponds to 1 data segment whose data type is a floating-point number, which is used for recording uniform zooming transformation. The rotation information corresponds to 4 data segments whose data type is a floating-point number. 1 data segment whose data type is the floating-point number is used for recording a rotation angle, and 3 data segments whose data type is the floating-point number are used for recording an axis of rotation.

In this embodiment of this application, the triangular meshes and the transformation files corresponding to the basic submodels may be directly read from the storage space, thereby obtaining the basic submodels in the 3D model and transformation information from the basic submodels to other submodels.

In a possible implementation, the 3D model includes triangular meshes corresponding to the submodels. After the electronic device stores the 3D model in the storage space, the triangular meshes corresponding to the submodels instead of the triangular meshes and the transformation files corresponding to the basic submodels are stored in the storage space. In this case, the basic submodels in the 3D model and transformation information need to be determined based on the triangular meshes corresponding to the submodels in the 3D model.

In some embodiments, the determining a basic submodel in the 3D model includes: classifying the submodels in the 3D model into at least one category according to the texture data of the submodels in the 3D model; and selecting, for any of the at least one category, any submodel from the submodels in the category as a basic submodel in the category.

In this embodiment of this application, there are many transformation manners, and the basic submodel may be transformed to another submodel in any of the transformation manners. For example, the basic submodel is transformed to another submodel through 3D affine transformation. When transformation is performed through 3D affine transformation, the 3D coordinates of the vertices in the triangular mesh may change. Since the 3D coordinates of the vertices may change, the plane equation of the triangular surface, the straight line equation of the straight line between any two vertices in the triangular surface, and the normal vector of the triangular surface may change. However, the identification information of the vertices and the texture coordinates of the vertices in the triangular mesh may not change. In other words, when the basic submodel is transformed to another submodel, the shape of the submodel may change, but the texture data of the submodel may not change.

Therefore, when the texture data of any two submodels in the 3D model are the same, which indicates that the two submodels are transformed from a same basic submodel, the two submodels may be classified into a same category. In this manner, the submodels in the 3D model may be classified into categories. In some embodiments, when quantities of texture coordinates corresponding to two submodels are the same (that is, quantities of vertices are the same), it is determined that texture data of the two submodels is the same. In some embodiments, when the quantities of the texture coordinates corresponding to the two submodels are the same, texture coordinates of vertices corresponding to the submodels may be sorted. When sorted texture coordinates corresponding to the two submodels are the same, the texture data of the two submodels is the same.

In some embodiments, each submodel corresponds to a piece of material information. For example, material information corresponding to the leaf model may be plastic, paper, cloth, or the like. When the basic submodel is transformed to another submodel, the material information corresponding to the submodel may also change. Therefore, the submodels may alternatively be classified into at least one category based on the texture data and the material information of the submodels. When the texture data and the material information of any two submodels are the same, the two submodels are classified into a same category. In this manner, the submodels in the 3D model may be classified into a plurality of categories. For example, a plurality of leaf models are classified in advance according to material information of the leaf models. For each category, the category is reclassified according to texture data of the leaf models. Alternatively, the plurality of leaf models are classified in advance according to the texture data of the leaf models. For each category, the category is reclassified according to material data of the leaf models. In other words, a sequence of the texture data and the material data on which the classification is based is not limited in this embodiment of this application.

After the plurality of submodels are classified into at least one category, any submodel may be selected from the submodels of any category as a basic submodel in the category. Next, the determining transformation information from the basic submodel to another submodel includes: determining transformation information from the basic submodel in the category to another submodel in the category, the another submodel in the category being a submodel in the category other than the basic submodel in the category. In this embodiment of this application, for any category, transformation information from the basic submodel in the category to another submodel in the category may be calculated based on a triangular mesh of the basic submodel in the category and a triangular mesh of the another submodel in the category.

In a possible implementation, the determining transformation information from the basic submodel in the category to another submodel in the category includes: determining a first envelope box of the basic submodel in the category; determining a second envelope box of the another submodel in the category; and determining the transformation information of the transformation from the basic submodel in the category to another submodel in the category based on the first envelope box and the second envelope box. Triangular mesh data corresponding to the basic submodel may be acquired. Since data of vertices in the triangular mesh corresponding to the basic submodel is recorded in the triangular mesh data, data of an envelope box of the basic submodel may be determined based on the data of the vertices (e.g., 3D coordinates of the vertices), thereby determining the first envelope box (i.e., the envelope box of the basic submodel). The first envelope box surrounds vertices and triangular surfaces corresponding to the basic submodel. In a possible implementation, the first envelope box is a minimum envelope box (i.e., a bounding box) surrounding the basic submodel. In some embodiments, through principal component analysis (PCA), at least one of information such as directions of three coordinate axes, lengths of three sides, and coordinates of a central point may be determined by analyzing the triangular mesh data corresponding to the basic submodel. Determining the information is equivalent to determining the minimum envelope box surrounding the basic submodel. The minimum envelope box is a cuboid.

In a 3D scene, a set of mutually orthogonal coordinate axes may be found from the 3D space through PCA, to obtain directions of three coordinate axes of the minimum envelope box. The direction of the first coordinate axis is such that after the vertices corresponding to the basic submodel are projected on the coordinate axis, variances of projected vertices are maximum. The direction of the second coordinate axis is such that in a plane orthogonal to the first coordinate axis, after the vertices corresponding to the basic submodel are projected on the coordinate axis, variances of projected vertices are maximum. The direction of the third coordinate axis is such that in a plane orthogonal to the first two coordinate axes, after the vertices corresponding to the basic submodel are projected on the coordinate axis, variances of projected vertices are maximum. 3D coordinates of the vertices corresponding to the basic submodel are averaged, coordinates of a central point of the basic submodel may be obtained, and the coordinates of the central point of the basic submodel are taken as the coordinates of the central point of the minimum envelope box. The lengths of the three sides of the minimum envelope box are determined based on distribution of the vertices corresponding to the basic submodel on the three coordinate axes.

Finally, data of an envelope box of the another submodel may be determined in the manner of determining the first envelope box, thereby determining the second envelope box (i.e., the envelope box of the another submodel), and the transformation information of the transformation from the basic submodel to the another submodel may be calculated based on the data of the envelope box of the basic submodel and the data of the envelope box of the another submodel.

In this embodiment of this application, storage resources required when the transformation information from the basic submodel to the another submodel is stored are fewer than those required when 3D mesh data and texture images of the another submodel are stored. Therefore, through the determination of the basic submodel and the transformation information from the basic submodel to the another submodel, the electronic device only needs to store the basic submodel and the transformation information without storing the another submodel, thereby reducing occupation of the storage resources and reducing hardware requirements for the electronic device.

Step A2: Determine cross-section data corresponding to the basic submodel.

In this embodiment of this application, the data of the envelope box of the basic submodel may be determined based on the triangular mesh data corresponding to the basic submodel. Based on the data of the envelope box, cross-section data representing any cross section of the envelope box is determined, to obtain the cross-section data corresponding to the basic submodel.

In some embodiments, the envelope box is a minimum envelope box, the minimum envelope box corresponds to a plurality of cross sections passing through a center of the minimum envelope box, and each cross section corresponds to data of one cross section. For any cross section, the basic submodel is projected onto the cross section to obtain a projection area corresponding to the cross section. For example, various triangular surfaces in the triangular mesh corresponding to the basic submodel are projected onto the cross section, to obtain projected triangular surfaces. An area of any projected triangular surface may be determined. The areas of the projected triangular surfaces are added to obtain the projection area corresponding to the cross section. A maximum projection area is selected from the projection areas corresponding to the cross sections. Data of the cross section corresponding to the maximum projection area is taken as the cross-section data of the basic submodel.

Referring to FIG. 3, FIG. 3 is a schematic diagram of acquiring cross-section data of a base leaf model according to an embodiment of this application. A model shown by 301 in (1) in FIG. 3 is the base leaf model. A minimum envelope box of the base leaf model may be first determined, as shown by 303 in (1) in FIG. 3. Next, a plurality of cross sections passing through a center of the minimum envelope box are determined. For any cross section, a projection area of the base leaf model projected onto the cross section is determined, to obtain a projection area corresponding to the cross section. Based on the projection areas corresponding to the cross sections, a cross section corresponding to a maximum projection area is selected, as shown by 302 in (1) in FIG. 3. Data of the cross section corresponding to the maximum projection area is taken as cross-section data of the base leaf model, to use the cross-section data of the base leaf model to represent the cross section corresponding to the maximum projection area in the minimum envelope box of the base leaf model, as shown in (2) in FIG. 3. The cross section is formed by triangular surfaces located on a same plane.

Step A3: Determine cross-section data corresponding to the another submodel based on the cross-section data corresponding to the basic submodel and the transformation information.

After the transformation information of the transformation from the basic submodel to the another submodel and the cross-section data corresponding to the basic submodel are determined, the cross-section data may be transformed based on the transformation information to obtain transformed cross-section data. The transformed cross-section data is the cross-section data corresponding to the another submodel. Since an amount of calculation involved in the transformation of the cross-section data based on the transformation information is less than that involved in the determination of the cross-section data corresponding to the submodel through the triangular mesh data corresponding to the submodel, according to this embodiment of this application, the cross-section data of the submodels can be quickly and accurately acquired, reducing the amount of calculation.

Certainly, in practical applications, a same principle as determining the cross-section data of the basic submodel may alternatively be used to first determine data of an envelope box of the another submodel based on the triangular mesh data of the another submodel and then determine the cross-section data corresponding to the another submodel based on the data of the envelope box of the another submodel.

In this embodiment of this application, the lower level may be any level in the at least two levels other than the highest level, including, but not limited to, the lowest level in the at least two levels. In this embodiment of this application, the dataset at the higher level is determined based on the dataset at the lower level.

In a possible implementation, the determining a dataset at a higher level based on a dataset at a lower level includes step B1 and step B2.

Step B1: For any two pieces of cross-section data in the dataset at the lower level, determine, in response to the two pieces of cross-section data satisfying an aggregation condition, cross-section data corresponding to the two pieces of cross-section data based on submodels corresponding to the two pieces of cross-section data.

After pieces of cross-section data in the dataset at the lower level are determined, the pieces of cross-section data may be aggregated, so as to use a new piece of cross-section data to approximate at least two pieces of cross-section data before aggregation.

In this embodiment of this application, it may be determined whether the two pieces of cross-section data in the dataset at the lower level satisfies the aggregation condition. In some embodiments, the two pieces of cross-section data satisfying an aggregation condition includes at least one of a case C1 and a case C2.

In the case C1, a distance between cross sections indicated by the two pieces of cross-section data is less than a distance threshold.

In this embodiment of this application, center coordinates of a cross section indicated by one piece of cross-section data may be determined, so as to use the center coordinates to represent a center of the cross section. A distance between centers of two cross sections is calculated by using center coordinates of two corresponding pieces of cross-section data, and the distance is taken as a distance between the two cross sections.

If a distance between two cross sections is less than the distance threshold, cross-section data corresponding to the two cross sections satisfies the aggregation condition. The distance threshold is not limited in this embodiment of this application. For example, the distance threshold is related to a number of levels at a current level. A smaller number of levels at the current level indicates that the current level is higher. Then, a LOD of the current level is coarser, a dataset at the current level includes a smaller amount of cross-section data, and the distance threshold is larger. In some embodiments, the distance threshold is preset.

In the case C2, an angle of normal vectors between the cross sections indicated by the two pieces of cross-section data is less than an angle threshold.

In this embodiment of this application, the triangular mesh data corresponding to any submodel may include normal vectors of triangular surfaces in the triangular mesh corresponding to the submodel, or normal vectors of triangular surfaces in the triangular mesh corresponding to any submodel may be determined based on data of vertices in the triangular mesh data corresponding to the submodel. Each normal vector corresponds to a direction. The direction may be a positive direction (from the inside of the envelope box of the submodel to the outside) or a negative direction (from the outside of the envelope box of the submodel to the inside).

Since any piece of cross-section data corresponds to at least one submodel, an average direction may be calculated based on directions corresponding to normal vectors of triangular surfaces corresponding to the at least one submodel, and a normal vector of a cross section indicated by the piece of cross-section data is determined based on the average direction and the piece of cross-section data.

If an angle of normal vectors (i.e., a normal vector angle) between cross sections indicated by any two pieces of cross-section data is less than the angle threshold, the two pieces of cross-section data satisfy the aggregation condition. The angle threshold is not limited in this embodiment of this application. For example, the angle threshold is a set value. For example, the angle threshold is 30 degrees. In some embodiments, the angle threshold is related to a number of levels at a current level. A smaller number of levels at the current level indicates that the current level is higher. Then, a LOD of the current level is coarser, a dataset at the current level includes a smaller amount of cross-section data, and the angle threshold is larger. In some embodiments, the angle threshold is preset. Schematically, an angle threshold at the third level is preset to a third angle value, an angle threshold at the second level is preset to a second angle value, and the third angle value is less than the second angle value.

For two pieces of cross-section data satisfying the aggregation condition, a same principle as "determining cross-section data of the basic submodel" may be used to determine a piece of cross-section data based on submodels corresponding to the two pieces of cross-section data and take the piece of cross-section data as cross-section data corresponding to the two pieces of cross-section data, so as to use the piece of cross-section data to approximate the two pieces of cross-section data to realize aggregation of the two pieces of cross-section data. That is, the submodels corresponding to the two pieces of cross-section data are taken as a combination, data of an envelope box of the combination is determined, cross-section data corresponding to the combination is determined based on the data of the envelope box, and the cross-section data corresponding to the two pieces of cross-section data is obtained. This process may be obtained with reference to the description of step A2 above, which is not described in detail again herein.

Through step B1, two pieces of cross-section data at the lower level that satisfy the aggregation condition are aggregated according to positions and directions of cross sections indicated by the cross-section data at the lower level, and the two pieces of cross-section data are not aggregated with other pieces of cross-section data at the lower level. Through the aggregation, an amount of the cross-section data is reduced, and the LOD is reduced.

Step B2: Take, in response to an amount of cross-section data in a candidate dataset being less than a reference amount, the candidate dataset as the dataset at the higher level, the candidate dataset including cross-section data corresponding to the two pieces of cross-section data satisfying the aggregation condition and cross-section data not satisfying the aggregation condition.

It may be understood that, when the cross-section data at the lower level is aggregated, the two pieces of cross-section data satisfying the aggregation condition may be aggregated into a piece of cross-section data, but part of the cross-section data cannot be aggregated. In this embodiment of this application, the cross-section data corresponding to the two pieces of cross-section data satisfying the aggregation condition may be used for aggregation with cross-section data corresponding to two other pieces of cross-section data satisfying the aggregation condition, or may be used for aggregation with the cross-section data not satisfying the aggregation condition, and the cross-section data not satisfying the aggregation condition is further used for aggregation with another piece of cross-section data not satisfying the aggregation condition. Therefore, the cross-section data corresponding to the two pieces of cross-section data satisfying the aggregation condition and the cross-section data not satisfying the aggregation condition are used in a same manner. For ease of description, the cross-section data corresponding to the two pieces of cross-section data satisfying the aggregation condition and the cross-section data not satisfying the aggregation condition are regarded as cross-section data in a set. The set is called a candidate dataset.

Cross-section data at the lower level is aggregated to obtain cross-section data in the candidate dataset, so that an amount of the cross-section data is reduced, a quantity of submodels corresponding to the cross-section data may be increased, and a plurality of submodels can be rendered at a time during subsequent rendering of the cross-section data, which increases a rendering speed and improves rendering efficiency.

In response to the amount of the cross-section data in the candidate dataset being no less than the reference amount, the candidate dataset is taken as the dataset at the higher level. The reference amount is not limited in this embodiment of this application. For example, the reference amount is related to a number of levels at the higher level. A smaller number of levels indicates a higher level, and the reference amount is smaller. In some embodiments, the reference amount is preset.

In this embodiment of this application, the method further includes step B3, and step B3 is performed after step B1.

Step B3: Take, in response to the amount of the cross-section data in the candidate dataset being no less than the reference amount, the candidate dataset as the dataset at the lower level, cyclically perform the determining, in response to the two pieces of cross-section data satisfying an aggregation condition, cross-section data corresponding to the two pieces of cross-section data based on submodels corresponding to the two pieces of cross-section data until the amount of the cross-section data in the candidate dataset is less than the reference amount, and take the candidate dataset as the dataset at the higher level.

In this embodiment of this application, in response to the amount of the cross-section data in the candidate dataset being no less than the reference amount, the candidate dataset is taken as the dataset at the lower level, and step B1 is re-performed to obtain the candidate dataset. It is determined according to the amount of the cross-section data in the candidate dataset whether to perform step B2 or step B3. When step B2 is performed, a loop ends, and the dataset at the higher level is obtained. When step B3 is performed, the loop continues. In this manner, cross-section data aggregation is performed one or more times on the dataset at the lower level until cross-section data is less than reference data, thereby obtaining the dataset at the higher level.

Figure 4:
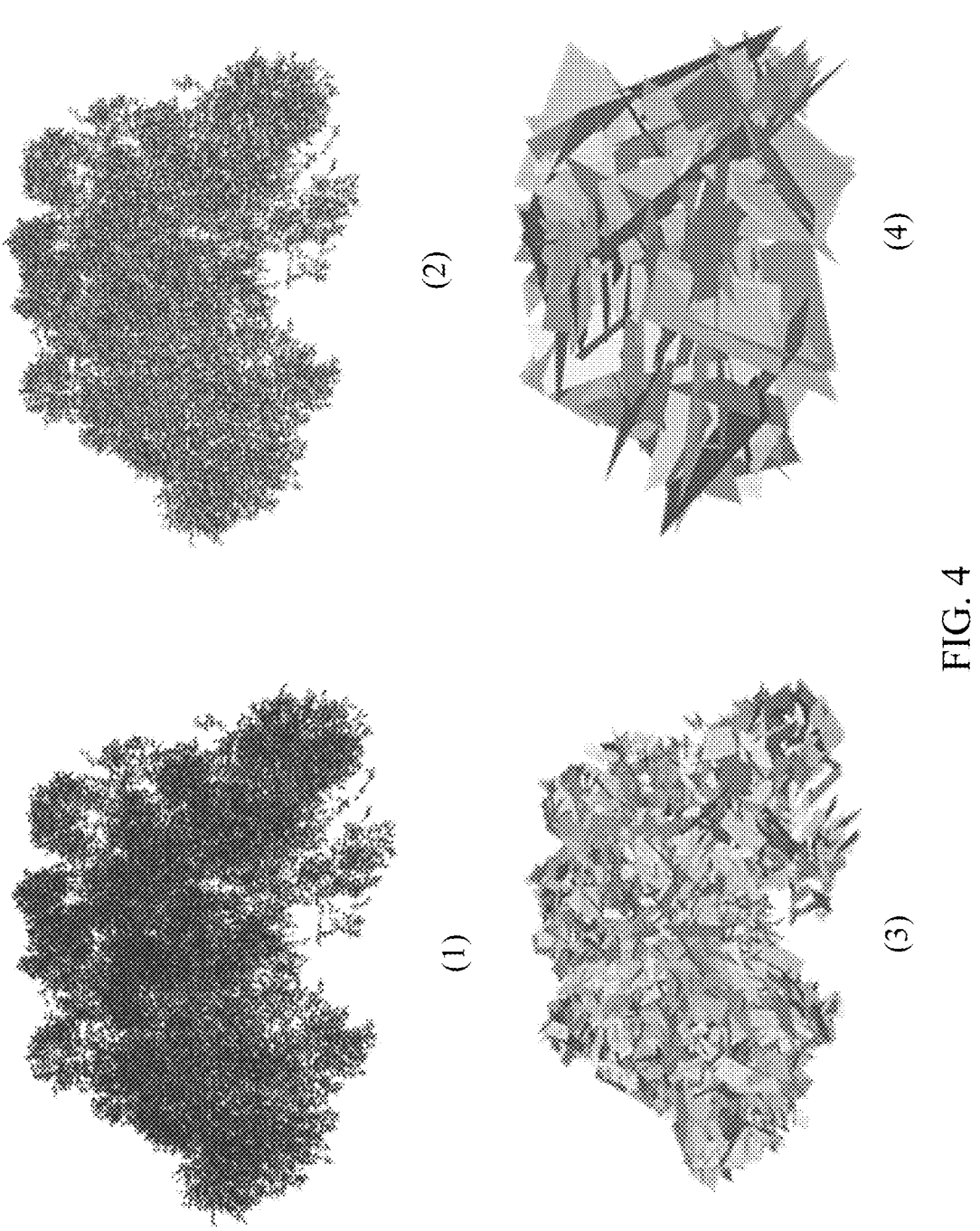
FIG. 4 is a schematic diagram of datasets at various levels according to an embodiment of this application.

Referring to FIG. 4, FIG. 4 is a schematic diagram of datasets at various levels according to an embodiment of this application. (1) in FIG. 4 shows all leaf models in the plant model, with a total of 6004752 leaf models. (2) in FIG. 4 shows a dataset at the lowest level determined based on (1) in FIG. 4. The dataset includes 307936 pieces of cross-section data. Cross-section data aggregation is performed one or more times on the dataset shown in (2) in FIG. 4, to obtain a dataset shown in (3) in FIG. 4. The dataset is a dataset at a higher level of the lowest level, and the dataset includes 15408 pieces of cross-section data. Cross-section data aggregation is performed one or more times on the dataset shown in (3) in FIG. 4, to obtain a dataset shown in (4) in FIG. 4. The dataset is a dataset of two higher levels of the lowest level, and the dataset includes 762 pieces of cross-section data. In FIG. 4, a region in a darker color indicates that a direction of a normal vector of a cross section corresponding to the region is closer to the positive direction, and a region in a lighter color indicates that a direction of a normal vector of a cross section corresponding to the region is closer to the negative direction.

Step 2012: Obtain the cross-section dataset based on the datasets at the at least two levels in response to satisfying a set condition.

The set condition is not limited in this embodiment of this application. For example, to satisfy the set condition, the higher level is the highest level in the at least two levels, or each time step 2011 is performed, a number of loops is updated. That is, 1 is added to a number of previous loops to obtain a number of current loops. Then, to satisfy the set condition, the number of loops reaches a set number.

In this embodiment of this application, the method further includes step 2013. Step 2013 is performed after step 2011.

Step 2013: Take, in response to not satisfying the set condition, the dataset at the higher level as the dataset at the lower level, cyclically perform the determining a dataset at a higher level based on a dataset at a lower level until the set condition is satisfied, and obtain the cross-section dataset based on the datasets at the at least two levels.

In this embodiment of this application, when the set condition is not satisfied, the dataset at the higher level is taken as the dataset at the lower level, step 2011 is cyclically performed, and it is determined whether the set condition is satisfied. When the set condition is satisfied, the loop ends, and a cross-section dataset is obtained. When the set condition is not satisfied, the loop continues. In this manner, a dataset at a higher level may be continuously determined based on a dataset at the lowest level, until the cross-section dataset is obtained.

In this embodiment of this application, any piece of cross-section data at a higher level corresponds to any piece of cross-section data at a lower level. In this manner, cross-section data at different levels are associated. In this embodiment of this application, cross-section data at various levels may be stored by using an index structure. The index structure may also be called a LOD data structure, and the index structure is a tree structure. Therefore, the index structure may be called a LOD tree structure.

The LOD tree structure includes at least two levels. The highest level corresponds to at least one root node. The lowest level corresponds to a plurality of leaf nodes. When there are only two levels, one root node at the highest level corresponds to at least one leaf node at the lowest level, and the root node represents one piece of cross-section data in the dataset at the highest level. Therefore, a quantity of the root node is equal to that of the cross-section data in the dataset at the highest level. The leaf node has no child nodes. One leaf node represents one piece of cross-section data in the dataset at the lowest level. Therefore, a quantity of the leaf node is equal to that of the cross-section data in the dataset at the lowest level. In a possible implementation, the dataset at the lowest level includes the cross-section data of the submodels in the 3D model. Therefore, a quantity of the leaf node is equal to that of the submodels.

When the LOD tree structure includes more than two levels, the LOD tree structure further includes at least one intermediate level, and the intermediate level is any level other than the lowest level and the highest level. One intermediate level corresponds to a plurality of intermediate nodes. In this case, one root node at the highest level corresponds to at least one intermediate node at a next intermediate level, and one intermediate node at a previous intermediate level corresponds to at least one intermediate node at a next intermediate level. One intermediate node at the last intermediate level corresponds to at least one leaf node at the lowest level.

Figure 5:
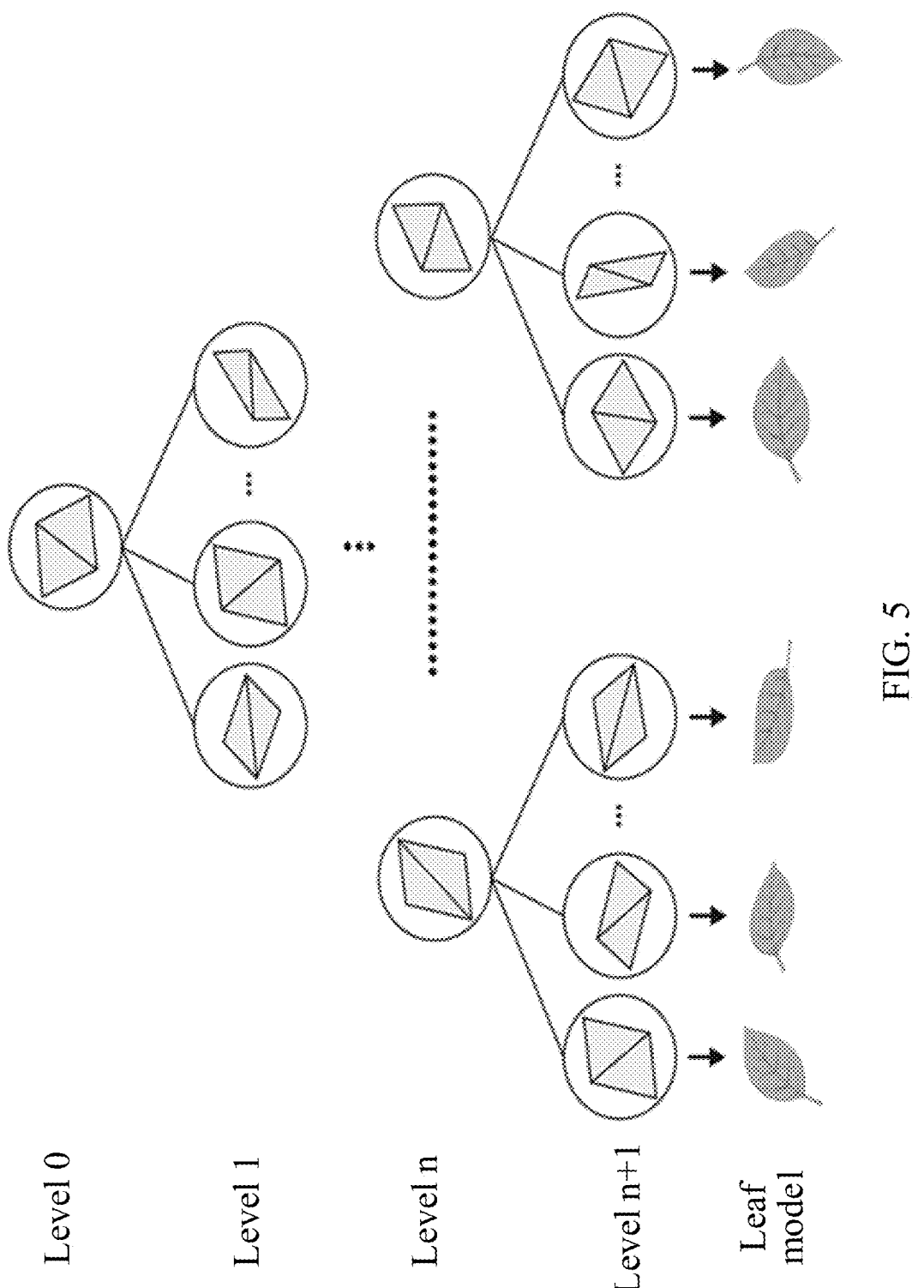
FIG. 5 is a schematic diagram of an index structure according to an embodiment of this application.

Referring to FIG. 5, FIG. 5 is a schematic structural diagram of a LOD tree structure according to an embodiment of this application. The LOD tree structure includes a level 0 to a level n+1, where n is a positive integer. Any level corresponds to a plurality of nodes each representing a piece of cross-section data. The level n+1 is the lowest level, and pieces of cross-section data at the level n+1 sequentially correspond to various leaf models of the plant model. Therefore, a quantity of the cross-section data at the level n+1 is the same as that of the leaf models of the plant model. Any piece of cross-section data at the level n corresponds to at least one piece of cross-section data at the level n+1, and so on, until the level 0. The level 0 is the highest level. Any piece of cross-section data at the level 0 corresponds to at least one piece of cross-section data at the level 1.

Step 202: Acquire texture maps corresponding to the plurality of pieces of cross-section data in the cross-section dataset, any of the texture maps being used for representing texture data obtained by projecting texture data of submodels corresponding to a corresponding piece of cross-section data onto a cross section indicated by the corresponding piece of cross-section data, the corresponding piece of cross-section data being a piece of cross-section data in the plurality of pieces of cross-section data and corresponding to the texture map.

In this embodiment of this application, for any piece of cross-section data in the cross-section dataset, a texture map corresponding to the piece of cross-section data is determined according to texture data of submodels corresponding to the piece of cross-section data. For all the cross-section data in the cross-section dataset, the texture map corresponding to each piece of cross-section data is determined and obtained according to texture data of submodels corresponding to the piece of cross-section data. Correspondingly, when a piece of cross-section data is determined based on N submodels, texture data of the N submodels may be acquired, and texture data obtained by projecting the texture data of the N submodels projected onto a cross section indicated by the piece of cross-section data is a texture map corresponding to the piece of cross-section data. When the texture data of the submodels is projected onto the cross section indicated by the piece of cross-section data, the cross section includes a region in which projected texture data is located, the texture data in the region may reflect textures of the submodels after projection, and an outline of the region may reflect shapes of the submodels after projection. Therefore, the texture map corresponding to the piece of cross-section data may reflect textures and shapes of the submodels corresponding to the piece of cross-section data after projection, which ensures that the shapes of the submodels after projection may not deform and ensures fidelity of the textures of the submodels after projection.

In a possible implementation, before the acquiring texture maps corresponding to the plurality of pieces of cross-section data in the cross-section dataset, the method further includes: projecting, for any submodel corresponding to any piece of cross-section data, texture data of the submodel onto a cross section indicated by the piece of cross-section data, to obtain a texture map of the submodel; and fusing texture maps of submodels corresponding to the piece of cross-section data to obtain the texture map corresponding to the piece of cross-section data.

In this embodiment of this application, for any submodel corresponding to the cross-section data, the texture data corresponding to the submodel includes UV coordinates of vertices corresponding to the submodel and at least one texture image corresponding to the submodel. Generally, the UV coordinates of the vertices are used for determining texture values corresponding to the vertices, and the texture image includes texture values of a plurality of pixels. Therefore, the texture data corresponding to the submodel may be understood as the texture values of the pixels.

In some embodiments, in units of pixels, any pixel corresponding to the submodel is projected onto any cross section indicated by the cross-section data to obtain a projected pixel, and a texture value of any pixel is assigned to the projected pixel, so that a texture value of the projected pixel is the same as the texture value of the pixel before projection. The texture map of the submodel may be obtained by projecting the pixels corresponding to the submodel.

It may be understood that the submodel belongs to the 3D model, the texture data corresponding to the submodel is equivalent to 3D texture data, and the texture map of the submodel belongs to a 2D map. Therefore, in this embodiment of this application, the 3D texture data is projected into a 2D UV domain. During the projection, the pixels need to be projected onto the cross section. That is, each triangular surface corresponding to the submodel needs to be projected onto a cross-section region.

In a possible implementation, vertices of the submodel may be projected onto the cross-section region, to obtain projected vertices of the submodel. In this case, for any pixel, barycentric coordinates of the pixel are determined according to the projected vertices of the submodel, a texture value of the pixel before projection is acquired according to the barycentric coordinates and the vertices of the submodel, and the texture value of the pixel before projection is assigned to a projected pixel.

In the above manner, texture data of submodels corresponding to any piece of cross-section data may be projected onto a cross section indicated by the piece of cross-section data, to obtain texture maps of the submodels corresponding to the piece of cross-section data. Next, the texture maps of the submodels corresponding to the piece of cross-section data are fused to obtain a texture map corresponding to the piece of cross-section data. For example, any point on the cross section indicated by the piece of cross-section data corresponds to at least two pixels, and the two pixels belong to texture maps of different submodels. Then, pixel values of the at least two pixels are averaged, and a new pixel value may be obtained, thereby realizing fusion of the at least two pixels. In this manner, the texture maps of the submodels corresponding to the piece of cross-section data can be fused. In some embodiments, depths of the pixels may be appropriately adjusted according to positions of the pixels to optimize the texture map.

In this embodiment of this application, each piece of cross-section data in the cross-section dataset has a texture map corresponding thereto. If the cross-section dataset includes N pieces of cross-section data, there are also N texture maps. In some embodiments, the UV domain is evenly divided into $M=(\lfloor\sqrt{N}\rfloor+1)^2$ UV meshes, first N UV meshes are assigned to N pieces of cross-section data, and each UV mesh stores a texture map of the corresponding piece of cross-section data.

In some embodiments, a cross section indicated by one piece of cross-section data is formed by triangular surfaces located on a same plane. If a quantity of the triangular surfaces is A, each UV mesh may be subdivided into A UV submeshes, and one UV submesh is used for storing a texture map of one triangular surface.

Figure 6:
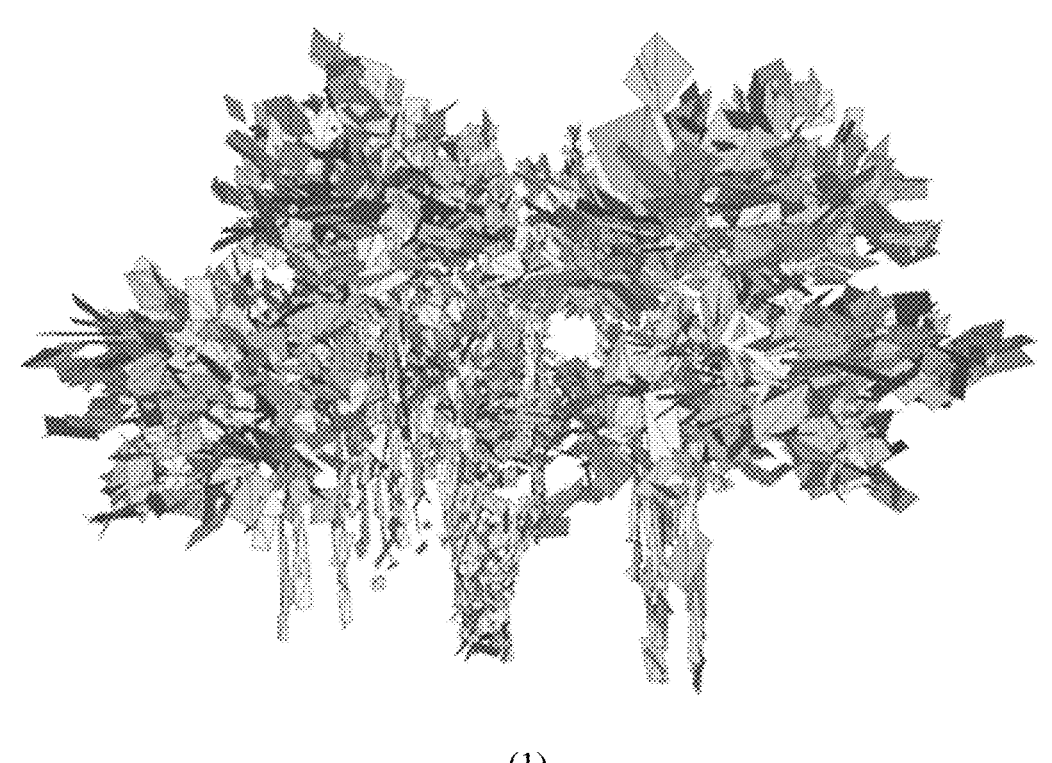
FIG. 6 is a schematic diagram of a texture map according to an embodiment of this application.

Referring to FIG. 6, FIG. 6 is a schematic diagram of a texture map according to an embodiment of this application. (1) in FIG. 6 shows cross sections indicated by pieces of cross-section data at a level in the cross-section dataset, and there are a total of 9440 cross sections. The left half of (2) in FIG. 6 shows texture maps corresponding to 9440 pieces of cross-section data. The right half of (2) in FIG. 6 shows an enlarged view of some texture maps. As can be seen from (2) in FIG. 6, texture data of at least one submodel is projected onto a cross section indicated by one piece of cross-section data to obtain a texture map corresponding to the piece of cross-section data, and the texture map may reflect textures and shapes of submodels after projection.

Step 203: Render the 3D model based on the plurality of pieces of cross-section data in the cross-section dataset and the corresponding texture maps.

In this embodiment of this application, for any piece of cross-section data in the cross-section dataset, a texture map corresponding to the piece of cross-section data may be rendered on a cross section indicated by the piece of cross-section data, to obtain a rendering result of the piece of cross-section data. The piece of cross-section data is used for indicating a cross section of an envelope box of at least one submodel, and a texture map corresponding to the piece of cross-section data is used for representing texture data obtained by projecting texture data of submodels corresponding to the piece of cross-section data onto the cross section indicated by the piece of cross-section data. Therefore, the rendering result of the piece of cross-section data is equivalent to rendering results of the submodels. A rendering result of the 3D model may be obtained by rendering the submodels of the 3D model.

In a possible implementation, the cross-section dataset includes at least two levels of datasets, the dataset at any level includes at least one piece of cross-section data, and one piece of cross-section data at a higher level corresponds to at least one piece of cross-section data at a lower level. Step 203 includes step 2031 and step 2032.

Step 2031: For any piece of cross-section data at the higher level, render, in response to the piece of cross-section data satisfying a first rendering condition and a second rendering condition, the piece of cross-section data according to the texture map corresponding to the piece of cross-section data to obtain a rendering result of the piece of cross-section data.

In some embodiments, from any level (such as the highest level) of the at least two levels, cross-section data at any level and various levels therebelow are traversed in order from top to bottom, and a piece of cross-section data satisfying the first rendering condition and the second rendering condition is rendered to obtain a rendering result of the piece of cross-section data.

The piece of cross-section data satisfying the first rendering condition includes a cross section indicated by the piece of cross-section data being within a view frustum. The piece of cross-section data satisfying the second rendering condition includes size data of the piece of cross-section data on a screen being no greater than a size threshold.

At the beginning of the rendering, a position of a camera, a camera parameter, and a position of the 3D model may be acquired. The camera parameter may indicate a relative relationship between the camera and the screen. On the one hand, it may be determined, through the position of the camera, the camera parameter, and the position of the 3D model, whether the cross section indicated by the cross-section data is within the view frustum. The view frustum is a 3D region. If an object is within the 3D region, the object is visible on the screen. Therefore, the view frustum is equivalent to a field of view of the camera. On the other hand, the size data of the piece of cross-section data on the screen may be calculated through the position of the camera, the camera parameter, and the position of the 3D model. The size data may be any one of a perimeter, an area, a diagonal length, and the like of the cross section indicated by the piece of cross-section data on the screen.

In this embodiment of this application, for any piece of cross-section data at a higher level, if the piece of cross-section data satisfies the first rendering condition, it indicates that the cross section indicated by the piece of cross-section data is wholly or partially within the view frustum. In this case, the submodels corresponding to the piece of cross-section data are within the field of view of the camera. Therefore, such submodels need to be rendered.

If the piece of cross-section data satisfies the second rendering condition, that is, the size data of the piece of cross-section data on the screen is no greater than the size threshold, which indicates that the submodels corresponding to the piece of cross-section data are relatively far away from the camera, the texture map corresponding to the piece of cross-section data may be directly acquired, and the texture map corresponding to the piece of cross-section data is rendered on the cross section indicated by the piece of cross-section data by using a pixel shader, to obtain the rendering result of the piece of cross-section data. The size threshold is not limited in this embodiment of this application. For example, the size threshold is a set value.

Step 2032: Obtain, in response to pieces of cross-section data at the higher level that satisfy the first rendering condition satisfying the second rendering condition, a rendering result of the 3D model based on rendering results of the pieces of cross-section data.

In response to the pieces of cross-section data at the higher level that satisfy the first rendering condition satisfying the second rendering condition, rendering results have been obtained for the pieces of cross-section data according to step 2031. In this case, all the submodels within the field of view of the camera have been rendered, and the rendering result of the 3D model may be obtained based on the rendering results of the pieces of cross-section data.

In a possible implementation, the method further includes step 2033 and step 2034. Step 2033 and step 2034 may be performed after step 2031.

Step 2033: Cyclically determine, in response to the higher level not being the lowest level of the at least two levels and the higher level including target cross-section data satisfying the first rendering condition but not satisfying the second rendering condition, pieces of cross-section data at a lower level corresponding to the target cross-section data; take the lower level as a higher level; and for any piece of cross-section data of the higher level, render, in response to the piece of cross-section data satisfying the first rendering condition and the second rendering condition, the piece of cross-section data according to a texture map corresponding to the piece of cross-section data to obtain a rendering result corresponding to the piece of cross-section data, until the pieces of cross-section data at the higher level that satisfy the first rendering condition satisfy the second rendering condition.

If the higher level is not the lowest level of the at least two levels and the pieces of cross-section data at the higher level that satisfy the first rendering condition include cross-section data not satisfying the second rendering condition, a loop starts. The cross-section data not satisfying the second rendering condition is taken as the target cross-section data. Then, the pieces of cross-section data at the lower level corresponding to the target cross-section data are taken as the cross-section data at the higher level, and step 2031 is performed to obtain a rendering result corresponding to any piece of cross-section data. When the pieces of cross-section data at the higher level that satisfy the first rendering condition include cross-section data not satisfying the second rendering condition, the loop continues. When the pieces of cross-section data at the higher level that satisfy the first rendering condition satisfy the second rendering condition, the loop ends.

Step 2034: Obtain the rendering result of the 3D model based on the rendering results of the pieces of cross-section data.

At the end of the loop, part of the cross-section data at any level may participate in the rendering. Therefore, the rendering results of the pieces of cross-section data include a rendering result of cross-section data at at least one level. The rendering result of the 3D model may be obtained based on the rendering results of the cross-section data at the at least two levels.

All the cross-section data participating in the rendering needs to satisfy the first rendering condition. That is, the cross sections indicated by the cross-section data need to be wholly or partially within the view frustum. Since the cross-section data at any level and various levels therebelow are traversed layer by layer in order from top to bottom in this embodiment of this application, if a cross section indicated by one piece of cross-section data at a level is wholly outside the view frustum, the piece of cross-section data does not participate in the rendering, and cross-section data corresponding to the piece of cross-section data and at various levels below this level does not participate in the rendering, either. If the cross section indicated by the piece of cross-section data is wholly or partially outside the view frustum, when the second rendering condition is satisfied, the piece of cross-section data does not participate in the rendering, or when the second rendering condition is not satisfied, there is a need to determine whether pieces of cross-section data at a lower level corresponding to the piece of cross-section data satisfy the first rendering condition and the second rendering condition, and it is determined according to a judgment result whether the piece of cross-section data participates in the rendering. In this manner, completely invisible cross sections can be quickly and efficiently eliminated, which saves an amount of cross-section data that needs to be rendered and improves rendering performance.

In a possible implementation, the method further includes step 2035 and step 2037. Step 2035 and step 2037 may be performed after step 2031.

Step 2035: Acquire, in response to the higher level being the lowest level of the at least two levels and the higher level including target cross-section data satisfying the first rendering condition but not satisfying the second rendering condition, a target submodel corresponding to the target cross-section data.

In this embodiment of this application, when the higher level being the lowest level of the at least two levels and the higher level includes the target cross-section data, since cross-section data at a lower level corresponding to the target cross-section data does not exist, a target submodel corresponding to the target cross-section data may be acquired, so as to render the target submodel and improve a rendering effect.

In some embodiments, the acquiring a target submodel corresponding to the target cross-section data includes: acquiring, in response to the target submodel corresponding to the target cross-section data being a basic submodel, the basic submodel; and acquiring, in response to the target submodel corresponding to the target cross-section data being another submodel, the basic submodel and transformation information from the basic submodel to the another submodel, and acquiring the another submodel based on the basic submodel and the transformation information.

The submodels in the 3D model include a basic submodel and other submodels other than the basic submodel. A manner of determining the basic submodel and the transformation information of the transformation from the basic submodel to the another submodel has been described above, which is not described in detail again herein.

Since the basic submodel may be transformed to another submodel through the basic submodel and the transformation information of the transformation from the basic submodel to the another submodel, the basic submodel and the another submodel have similar shapes and textures. The basic submodel and the transformation information of the transformation from the basic submodel to the another submodel are stored in the storage space, so that the electronic device only requires existence of the shape and the texture of the basic submodel but does not require existence of shapes and textures of the other submodels, which can prevent storage of shapes and textures of repeated submodels and reduce occupation of the storage space. In particular, the occupation of the storage space can be greatly reduced in the case of a larger number of submodels and higher complexity of the submodels (i.e., the submodels have more vertices and triangular surfaces).

In this embodiment of this application, each submodel in the 3D model has identification information corresponding thereto, a first mapping relationship between the identification information and the basic submodel and a second mapping relationship between the identification information, the basic submodel, and the transformation information may be stored in the storage space. Any identification information corresponding to the target cross-section data may be determined based on the target cross-section data, thereby determining the target submodel corresponding to the identification information. If the first mapping relationship includes the identification information, indicating that the target submodel is the basic submodel, the target submodel corresponding to the identification information may be directly acquired from the storage space. If the second mapping relationship includes the identification information, indicating that the target submodel is another submodel, the basic submodel corresponding to the identification information and the transformation information may be directly acquired from the storage space, and the basic submodel is transformed based on the transformation information to obtain the target submodel corresponding to the identification information.

Step 2036: Render the target submodel to obtain a rendering result of the target submodel. The target submodel may be rendered by using the pixel shader, and a rendering manner thereof is not limited herein.

Step 2037: Obtain the rendering result of the 3D model based on the rendering results of the pieces of cross-section data and the rendering result of the target submodel.

In this embodiment of this application, some submodels in the 3D model are rendered in terms of cross-section data thereof, while other submodels are directly rendered. Therefore, the rendering result of the 3D model may be directly obtained based on the rendering results of the pieces of cross-section data and the rendering result of the target submodel.

In the 3D model, all the submodels may be directly rendered. In this case, the rendering result of the 3D model is directly obtained based on rendering results of target submodels.

Figure 7:
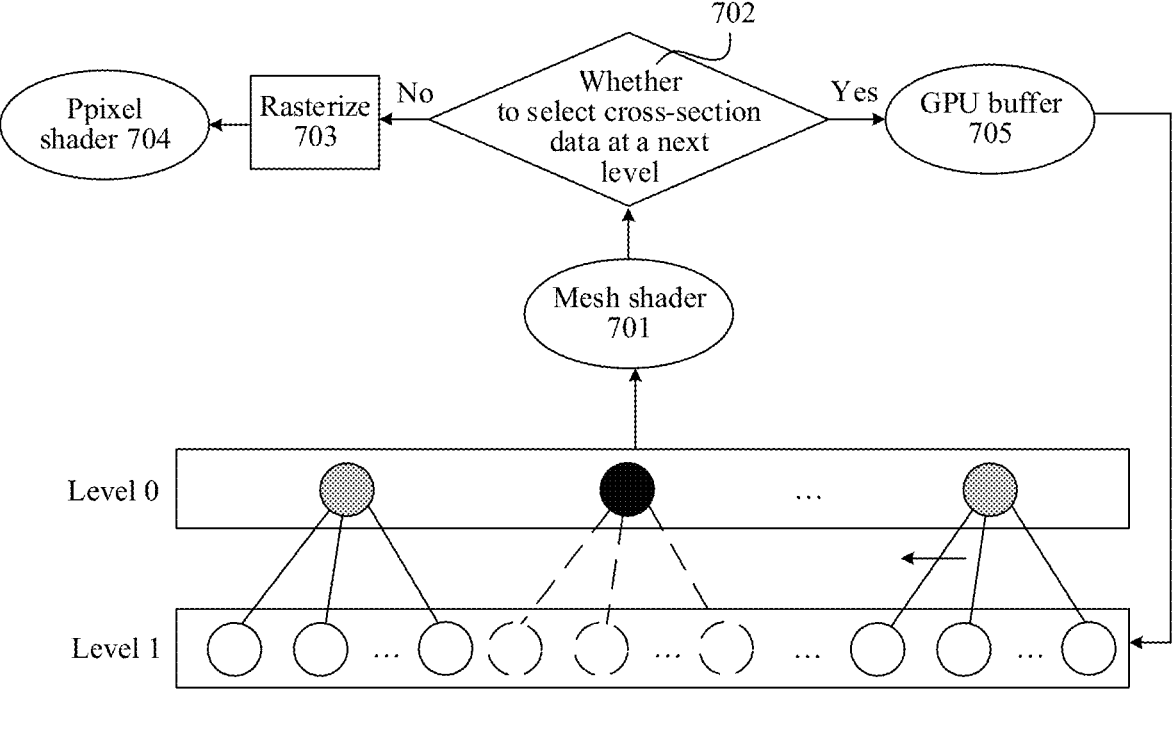
FIG. 7 is a schematic diagram of rendering according to an embodiment of this application.

Referring to FIG. 7, FIG. 7 is a schematic diagram of rendering according to an embodiment of this application. In this embodiment of this application, rendering is performed based on the LOD tree structure shown in FIG. 5. In this embodiment of this application, from the level 0, nodes of the LOD tree structure are traversed from top to bottom. For any node at the level 0, the node corresponds to a piece of cross-section data. Size data of the piece of cross-section data on the screen may be determined based on a mesh shader 701. The mesh shader 701 corresponds to at least one thread. One thread is used for determining the size data of the piece of cross-section data on the screen. That is, the thread is used for determining an edge length (i.e., a perimeter) of a cross section indicated by the piece of cross-section data when projected onto the screen. Then, step 702 is performed to determine whether to rotate cross-section data at a lower level. If the size data is no greater than the size threshold, it is determined that cross-section data at a lower level (i.e., the level 1) corresponding to the piece of cross-section data is not selected, and after the piece of cross-section data is rasterized 703, rasterized 703 cross-section data is rendered by using a pixel shader 704. Rasterizing 703 the piece of cross-section data is to project the cross section indicated by the piece of cross-section data onto the screen to obtain a cross section on the screen, and then the pixel shader 704 may render the cross section on the screen based on a texture map of the piece of cross-section data, to obtain a rendering result of the piece of cross-section data. For example, in FIG. 7, after cross-section data corresponding to a black node is rasterized 703, rendering is performed by using the pixel shader 704. If the size data is greater than the size threshold, it is determined that cross-section data at a lower level corresponding to the cross-section data is selected, and the cross-section data at the lower level is stored in a graphics processing unit (GPU) buffer. That is, cross-section data at the level 1 corresponding to the cross-section data is stored in a GPU buffer 705. For example, in FIG. 7, various nodes at a lower level corresponding to a gray node are stored in the GPU buffer 705.

After various nodes at the level 0 are all traversed, the nodes stored in the GPU buffer 705 may be traversed based on the mesh shader 701. Since nodes at a lower level corresponding to the nodes at the level 0 whose size data is greater than the size threshold are stored in the GPU buffer 705, such nodes may be sequentially processed in a same manner as the nodes at the level 0, which is not described in detail again herein. The nodes stored in the GPU buffer 705 are arranged in an orderly manner, which ensures continuous access to an internal memory and facilitates faster information retrieval.

When nodes at a lower level (i.e., the level n+1) corresponding to the nodes at the level n whose size data is greater than the size threshold are stored in the GPU buffer 705, such nodes at the level n+1 may be traversed based on the mesh shader 701. For any node, if size data corresponding to the node is no greater than the size threshold, cross-section data corresponding to the node may be rasterized 703, and the pixel shader 704 renders rasterized 703 cross-section data based on a texture map corresponding to the node. If the size data corresponding to the node is greater than the size threshold, a leaf model corresponding to the node may be rasterized 703, and the pixel shader 704 may render a rasterized 703 leaf model.

In this embodiment of this application, although the cross-section data is rendered, when the cross section indicated by the cross-section data is a quadrilateral, the quadrilateral may be regarded as being formed by two triangles, and an amount of calculation appears to be small. Moreover, rendering based on the LOD tree structure may reduce an amount of cross-section data that needs to be rendered, but in large-scale scenes, the amount of calculation is still large. The size data of the cross-section data on the screen is calculated by using the mesh shader, which can quickly determine whether to render the cross-section data, thereby speeding up the rendering and ensuring real-time performance of the rendering, so that a good rendering effect is still achieved even in real-time interactive scenes such as video scenes and game scenes according to this embodiment of this application. The mesh shader may be replaced with other GPU hardware (e.g., a compute shader).

In some related technologies, the entire 3D model is directly rendered, and when two consecutive frames of images are rendered based on this rendering manner, the entire 3D model is directly replaced. If positions of the camera and camera parameters corresponding to two consecutive frames of images greatly change, the 3D model may suddenly change, which may easily cause a visual defect. In this embodiment of this application, on the one hand, cross-section data at different levels is constructed for the submodels of the 3D model, the cross-section data at a level may be flexibly selected subsequently according to a position of the camera, a position of the submodel, and a camera parameter. Even if the position of the camera and the camera parameter greatly change, the entire 3D model may change relatively smoothly by rendering at a level of the submodel, thereby preventing a sudden visual defect caused by a great change in the 3D model. On the other hand, the cross-section data is rendered based on a texture map corresponding to the cross-section data. Since the texture map may retain information of the submodel such as a shape and a texture, the submodel may not deform even if the position of the camera and the camera parameter greatly change, which may also reduce visual defects to some extent.

The information (including, but not limited to, user equipment information, user personal information, and the like), data (including, but not limited to, data used for analysis, stored data, displayed data, and the like), and signals involved in this application are authorized by the user or fully authorized by all parties, and collection, use, and processing of relevant data need to comply with relevant laws, regulations, and standards of relevant countries and regions. For example, the 3D model and the like involved in this application are acquired in a case of sufficient authorization.

In the above method, cross-section data is acquired first, the cross-section data being used for indicating a cross section of an envelope box of at least one submodel, and then a texture map corresponding to the cross-section data is acquired, the texture map corresponding to the cross-section data being determined according to texture data of submodels corresponding to the cross-section data. Since the texture map represents texture data obtained by projecting the texture data of the submodels corresponding to the cross-section data onto a cross section indicated by any piece of cross-section data, shapes of the submodels after projection are not prone to deformation, so that the rendering effect can be improved during rendering based on the cross-section data and the corresponding texture map.

The 3D model rendering method provided in this embodiment of this application is elaborated above from the perspective of method steps, which is further described below in combination with scenes. In a scene in an embodiment of this application, the 3D model is a plant model, and the submodels are leaf models.

Figure 8:
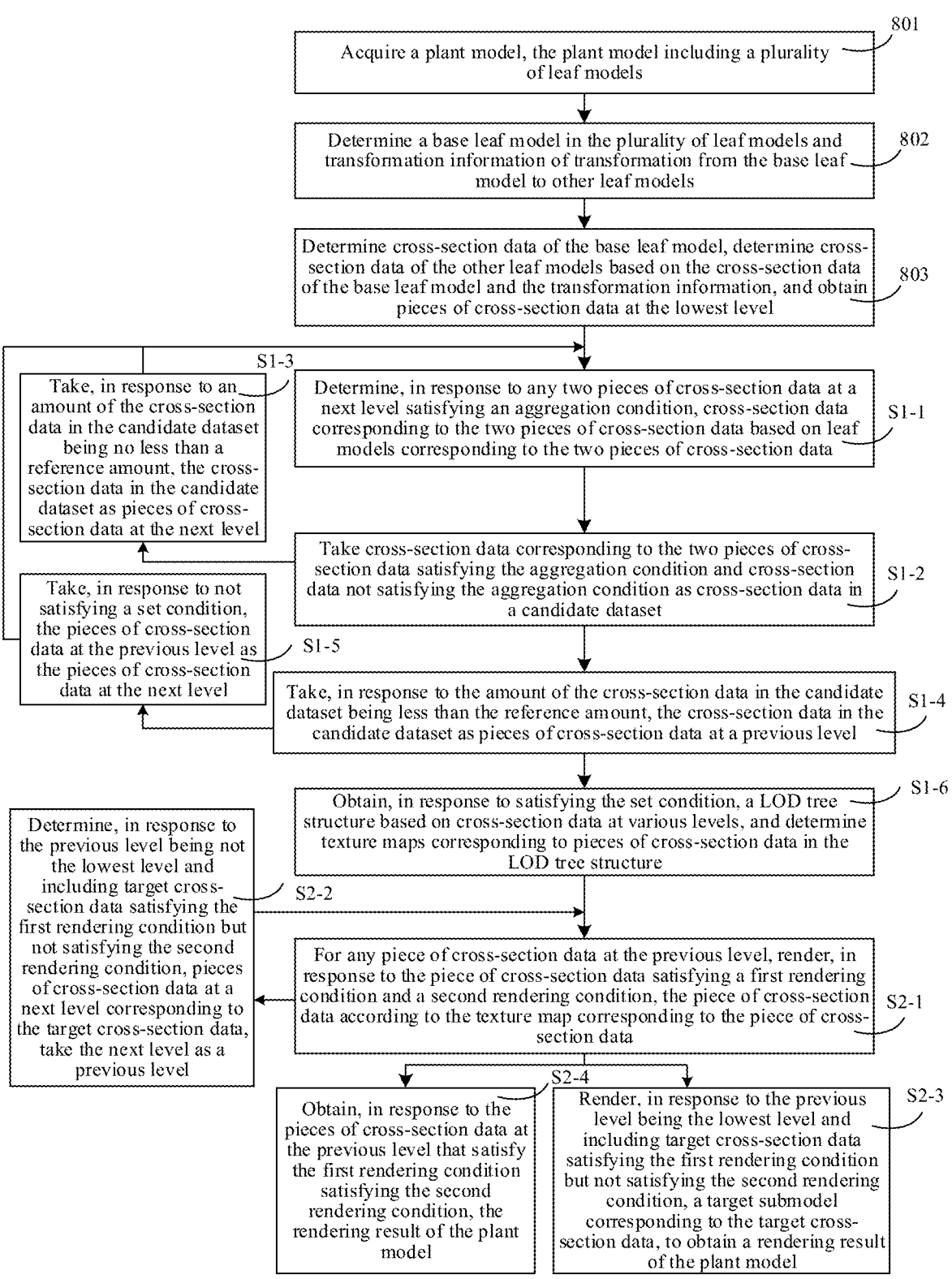
FIG. 8 is a schematic diagram of rendering of a plant model according to an embodiment of this application.

Referring to FIG. 8, FIG. 8 is a schematic diagram of rendering of a plant model according to an embodiment of this application.

Step 801: Acquire a plant model, the plant model including a plurality of leaf models.

Step 802: Determine a base leaf model in the plurality of leaf models and transformation information from the base leaf model to other leaf models. The other leaf models herein are leaf models in the plurality of leaf models other than the base leaf model.

The base leaf model corresponds to the basic submodel mentioned above, and the other leaf models correspond to the other submodels mentioned above.

Step 803: Determine cross-section data of the base leaf model, determine cross-section data of the other leaf models based on the cross-section data of the base leaf model and the transformation information, and obtain pieces of cross-section data at the lowest level. Next, step S1-1 is performed.

Step S1-1: Determine, in response to any two pieces of cross-section data at a lower level satisfying an aggregation condition, cross-section data corresponding to the two pieces of cross-section data based on leaf models corresponding to the two pieces of cross-section data.

Step S1-2: Take cross-section data corresponding to the two pieces of cross-section data satisfying the aggregation condition and cross-section data not satisfying the aggregation condition as cross-section data in a candidate dataset.

Step S1-3: Take, in response to an amount of the cross-section data in the candidate dataset being no less than a reference amount, the cross-section data in the candidate dataset as pieces of cross-section data at the lower level. Step S1 is performed again.

Step S1-4: Take, in response to the amount of the cross-section data in the candidate dataset being less than the reference amount, the cross-section data in the candidate dataset as pieces of cross-section data at a higher level.

Step S1-5: Take, in response to not satisfying a set condition, the pieces of cross-section data at the higher level as the pieces of cross-section data at the lower level, and perform step S1-1 again.

Step S1-6: Obtain, in response to satisfying the set condition, a LOD tree structure based on cross-section data at various levels, and determine texture maps corresponding to pieces of cross-section data in the LOD tree structure.

Step S2-1: For any piece of cross-section data at the higher level, render, in response to the piece of cross-section data satisfying a first rendering condition and a second rendering condition, the piece of cross-section data according to the texture map corresponding to the piece of cross-section data.

Step S2-2: Determine, in response to the higher level being not the lowest level and including target cross-section data satisfying the first rendering condition but not satisfying the second rendering condition, pieces of cross-section data at a lower level corresponding to the target cross-section data, take the lower level as a higher level, and perform step S2-1 again.

Step S2-3: Render, in response to the higher level being the lowest level and including target cross-section data satisfying the first rendering condition but not satisfying the second rendering condition, a target submodel corresponding to the target cross-section data, to obtain a rendering result of the plant model.

Step S2-4: Obtain, in response to the pieces of cross-section data at the higher level that satisfy the first rendering condition satisfying the second rendering condition, the rendering result of the plant model.

Figure 9:
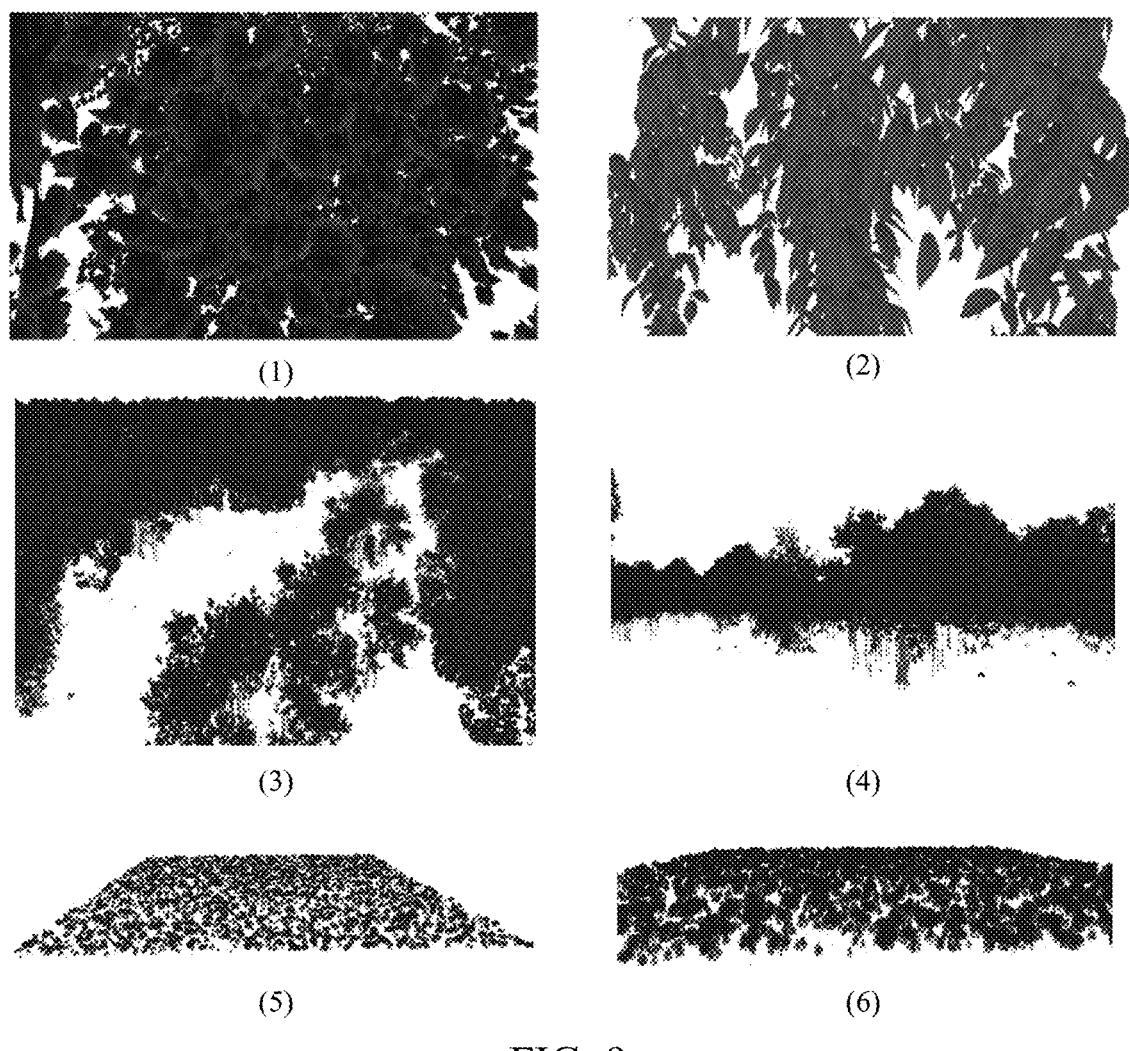
FIG. 9 is a schematic diagram of a rendering result of a plant model according to an embodiment of this application.

The plant model is rendered in the manner shown in FIG. 8. In some embodiments, the plant model is rendered in the manner shown in FIG. 8 by using DirectX 12 as a graphics programming application (API) on an electronic device with Windows 10 being an operating system, equipped with 24 central processing unit (CPU) cores, 128 CPU memory storages, and a NVIDIA GeForce RTX 3090 GPU (a graphics card). In this embodiment of this application, based on 15 plant models, leaf models of 10000 plant models are rendered by using the above electronic device. To better test rendering efficiency of the leaf models, occupation of the GPU by other tasks may be reduced. In this case, the rendering efficiency may be as high as 1500 frames per second (FPS), and each frame of image occupies up to 463 MB of an internal memory of the GPU. Rendering results are as shown in FIGS. 9. (1) and (2) in FIG. 9 are rendering results of the plant model when a rendering frame rate may be as high as 1321 FPS and 1557 FPS and the plant model is close to the camera. (3) and (4) in FIG. 9 are rendering results of the plant model when the rendering frame rate may be as high as 785 FPS and 894 FPS and the plant model is at an appropriate distance from the camera. (5) and (6) in FIG. 9 are rendering results of the plant model when the rendering frame rate may be as high as 1002 FPS and 1032 FPS and the plant model is far away from the camera.

In this embodiment of this application, 4 plant models may be acquired, a quantity of each plant model is set to 500, and a total of 2000 plant models are obtained. On the one hand, based on the 4 plant models, the 2000 plant models are rendered with a rendering method (such as a Nanite method) in the related technology by using the above electronic device, to obtain a rendering result shown in (1) in FIG. 10.

Figure 10:
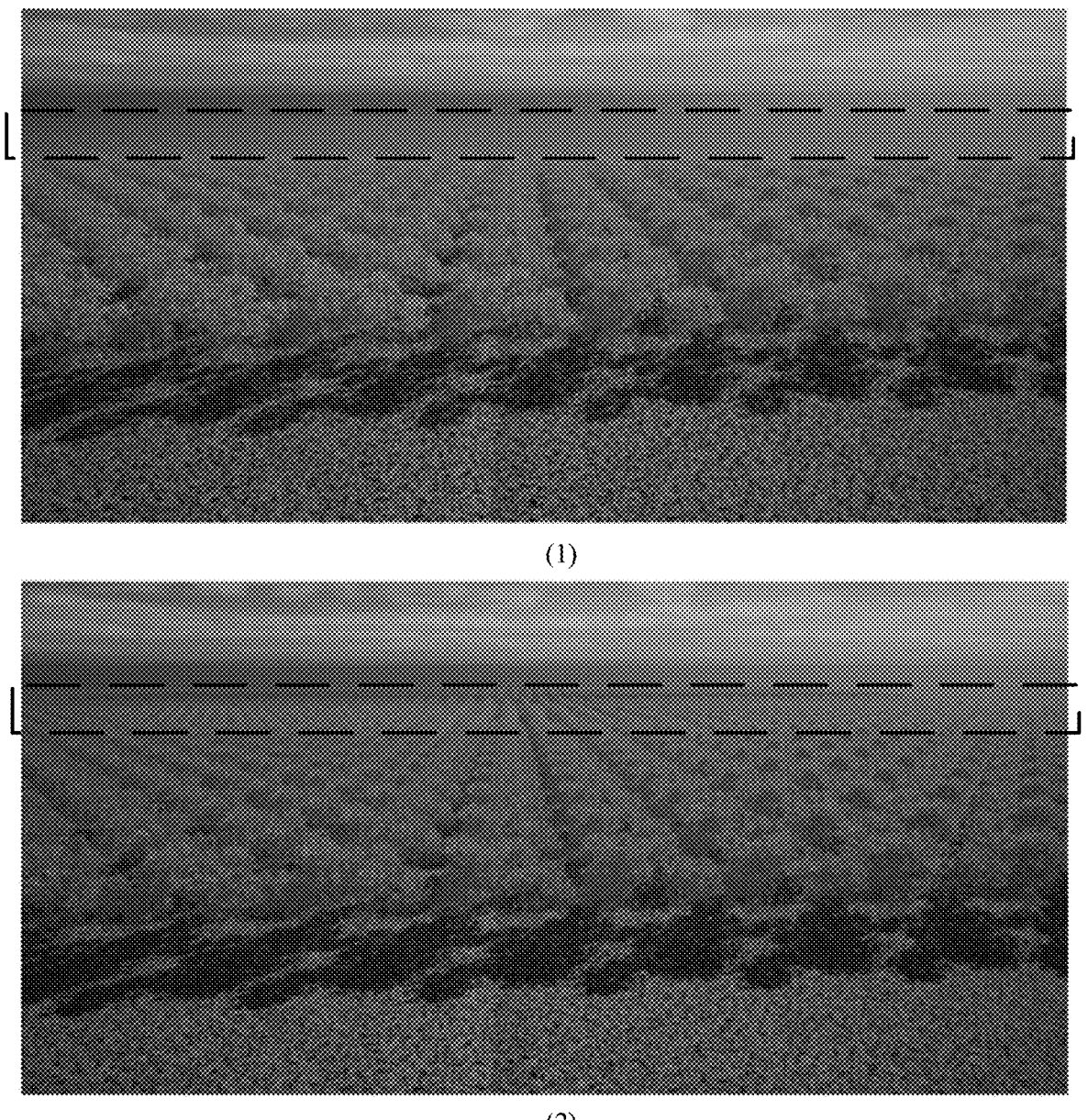
FIG. 10 is a schematic diagram of another rendering result of a plant model according to an embodiment of this application.
Figure 11:
FIG. 11 is a schematic diagram of a yet another rendering result according to an embodiment of this application.

On the other hand, based on the 4 plant models, the 2000 plant models are rendered with a rendering method shown in FIG. 8 by using the above electronic device, to obtain a rendering result shown in (2) in FIG. 10. Since Nanite needs to be used in UE5 (an Unreal Engine), rendering is performed based on UE5 in the rendering method in the related technology and the rendering method shown in FIG. 8. The rendering based on UE5 may introduce additional rendering costs, such as global illumination and shadows, and rendering may not be performed based on UE5 in the rendering method shown in FIG. 8. Therefore, rendering efficiency of the rendering method shown in FIG. 8 may be reduced. As can be seen from comparison between (1) and (2) in FIG. 10, the content shown in the dotted box in (1) does not show the plant model, while the content shown in the dotted box in (2) shows the plant model. Therefore, a rendering effect of the plant model can be improved with the rendering method shown in FIG. 8, preventing disappearance of the plant model. In addition, (1) in FIG. 10 is obtained by rendering in a rendering scene up to 76 FPS by using a GPU with an internal memory of 1146 MB and a leaf model of 5.7 ms/frame, while (2) in FIG. 10 is obtained by rendering in a rendering scene up to 102 FPS by using a GPU with an internal memory of 630 MB and a leaf model of 2.5 ms/frame. As can be seen, the rendering method shown in FIG. 8 has higher rendering efficiency and the rendering uses fewer computing resources. The 3D model rendering method provided in this embodiment of this application is applicable to many scenes, such as 3D video games, virtual reality, and geographical environment visualization. Referring to FIG. 11, FIG. 11 is a schematic diagram of a yet another rendering result according to an embodiment of this application. FIG. 11 shows a forest in a game scene. Since the rendering effect of the plant model can be improved in this embodiment of this application, game experience can be improved.

In an embodiment, the 3D model is a universe model, and the submodels are planet models.

A universe model is acquired. The universe model includes a plurality of planet models. A base planet model in the plurality of planet models and transformation information from the base planet model to other planet models are determined. The other planet models herein are planet models in the plurality of planet models other than the base planet model. The base planet model corresponds to the basic submodel mentioned above, and the other planet models correspond to the other submodels mentioned above. Cross-section data of the base planet model is determined, cross-section data of the other planet models is determined based on the cross-section data of the base planet model and the transformation information, and pieces of cross-section data at the lowest level are obtained.

In response to any two pieces of cross-section data at a lower level satisfying an aggregation condition, cross-section data corresponding to the two pieces of cross-section data is determined based on planet models corresponding to the two pieces of cross-section data. The cross-section data corresponding to the two pieces of cross-section data satisfying the aggregation condition and cross-section data not satisfying the aggregation condition are taken as cross-section data in a candidate dataset. In response to an amount of the cross-section data in the candidate dataset being no less than a reference amount, the cross-section data in the candidate dataset is taken as pieces of cross-section data at the lower level. In response to the amount of the cross-section data in the candidate dataset being less than the reference amount, the cross-section data in the candidate dataset is taken as pieces of cross-section data at a higher level. In response to not satisfying a set condition, the pieces of cross-section data at the higher level are taken as the pieces of cross-section data at the lower level. In response to satisfying the set condition, a LOD tree structure is obtained based on cross-section data at various levels, and texture maps corresponding to pieces of cross-section data in the LOD tree structure are determined. For any piece of cross-section data at the higher level, in response to the piece of cross-section data satisfying a first rendering condition and a second rendering condition, the piece of cross-section data is rendered according to the texture map corresponding to the piece of cross-section data. In response to the higher level being not the lowest level and including target cross-section data satisfying the first rendering condition but not satisfying the second rendering condition, pieces of cross-section data at a lower level corresponding to the target cross-section data are determined, and the lower level is taken as a higher level. In response to the higher level being the lowest level and including target cross-section data satisfying the first rendering condition but not satisfying the second rendering condition, a target submodel corresponding to the target cross-section data is rendered, to obtain a rendering result of the universe model. In response to the pieces of cross-section data at the higher level that satisfy the first rendering condition satisfying the second rendering condition, the rendering result of the universe model is obtained.

In an embodiment, the 3D model is a city model, and the submodels are building models.

A city model is acquired. The city model includes a plurality of building models. A base building model in the plurality of building models and transformation information from the base building model to other building models are determined. The other building models herein are building models in the plurality of building models other than the base building model. The base building model corresponds to the basic submodel mentioned above, and the other building models correspond to the other submodels mentioned above. Cross-section data of the base building model is determined, cross-section data of the other building models is determined based on the cross-section data of the base building model and the transformation information, and pieces of cross-section data at the lowest level are obtained.

In response to any two pieces of cross-section data at a lower level satisfying an aggregation condition, cross-section data corresponding to the two pieces of cross-section data is determined based on building models corresponding to the two pieces of cross-section data. The cross-section data corresponding to the two pieces of cross-section data satisfying the aggregation condition and cross-section data not satisfying the aggregation condition are taken as cross-section data in a candidate dataset. In response to an amount of the cross-section data in the candidate dataset being no less than a reference amount, the cross-section data in the candidate dataset is taken as pieces of cross-section data at the lower level. In response to the amount of the cross-section data in the candidate dataset being less than the reference amount, the cross-section data in the candidate dataset is taken as pieces of cross-section data at a higher level. In response to not satisfying a set condition, the pieces of cross-section data at the higher level are taken as the pieces of cross-section data at the lower level. In response to satisfying the set condition, a LOD tree structure is obtained based on cross-section data at various levels, and texture maps corresponding to pieces of cross-section data in the LOD tree structure are determined. For any piece of cross-section data at the higher level, in response to the piece of cross-section data satisfying a first rendering condition and a second rendering condition, the piece of cross-section data is rendered according to the texture map corresponding to the piece of cross-section data. In response to the higher level being not the lowest level and including target cross-section data satisfying the first rendering condition but not satisfying the second rendering condition, pieces of cross-section data at a lower level corresponding to the target cross-section data are determined, and the lower level is taken as a higher level. In response to the higher level being the lowest level and including target cross-section data satisfying the first rendering condition but not satisfying the second rendering condition, a target submodel corresponding to the target cross-section data is rendered, to obtain a rendering result of the city model. In response to the pieces of cross-section data at the higher level that satisfy the first rendering condition satisfying the second rendering condition, the rendering result of the city model is obtained.

Figure 12:
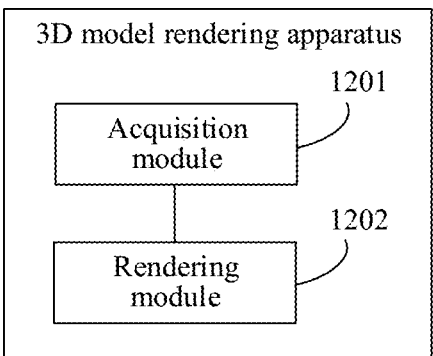
FIG. 12 is a schematic structural diagram of a 3D model rendering apparatus according to an embodiment of this application.

FIG. 12 is a schematic structural diagram of a 3D model rendering apparatus according to an embodiment of this application. As shown in FIG. 12, the apparatus includes:

an acquisition module 1201 configured to acquire a cross-section dataset, the cross-section dataset being constructed based on a plurality of submodels included in a 3D model of an object, the submodels respectively representing components of the object, texture data of the submodels representing texture information of the components, the cross-section dataset including a plurality of pieces of cross-section data, each of the plurality of pieces of cross-section data being used for indicating a cross section of an envelope box of at least one submodel;

the acquisition module 1201 being further configured to acquire texture maps corresponding to the plurality of pieces of cross-section data in the cross-section dataset, any of the texture maps being used for representing texture data obtained by projecting texture data of submodels corresponding to a corresponding piece of cross-section data onto a cross section indicated by the corresponding piece of cross-section data, the corresponding piece of cross-section data being a piece of cross-section data in the plurality of pieces of cross-section data and corresponding to the texture map; and a rendering module 1202 configured to render the 3D model based on the plurality of pieces of cross-section data in the cross-section dataset and the corresponding texture maps. The acquisition module 1201 is further configured to perform related operations in step 201 and step 202 in the method embodiment shown in FIG. 2. The rendering module 1202 is further configured to perform related operations in step 203 in the method embodiment shown in FIG. 2. Refer to the above method embodiment for specific content.

Figure 13:
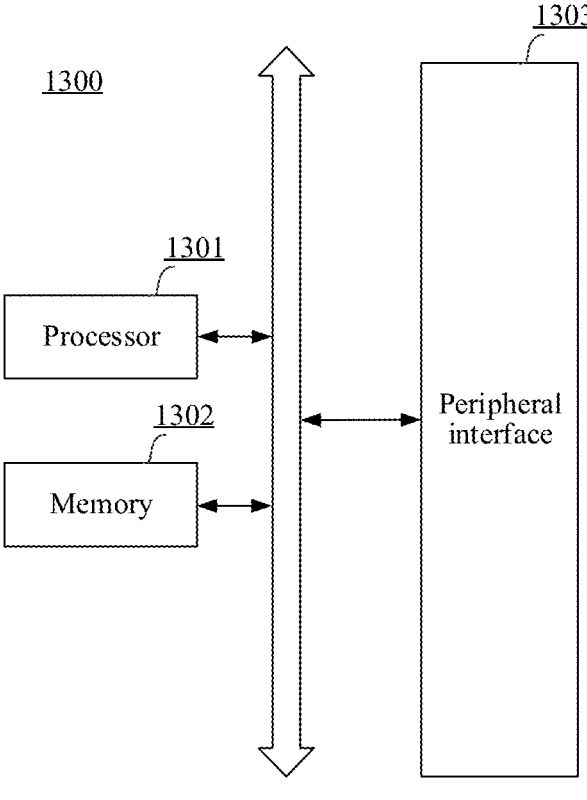
FIG. 13 is a schematic structural diagram of a terminal device according to an embodiment of this application.

FIG. 13 is a structural block diagram of a terminal device 1300 according to an exemplary embodiment of this application. The terminal device 1300 includes a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a GPU. The GPU is configured to render and draw content that needs to be displayed on a display screen. In some embodiments, the processor 1301 may further include an artificial intelligence (AI) processor. The AI processor is configured to process computing operations related to machine learning.

The memory 1302 may include one or more non-transitory computer-readable storage media. The computer-readable storage medium may be non-transient. The memory 1302 may further include a high-speed random access memory and a nonvolatile memory, for example, one or more disk storage devices or flash storage devices. In some embodiments, the non-transient computer-readable storage medium in the memory 1302 is configured to store at least one instruction, and the at least one instruction is configured to be executed by the processor 1301 to implement the 3D model rendering method provided in the method embodiments of this application.

In some embodiments, the terminal device 1300 may alternatively include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board.

A person skilled in the art may understand that the structure shown in FIG. 13 constitutes no limitation on the terminal device 1300, and the terminal device may include more or fewer components than those shown in the figure, or some components may be combined, or a different component deployment may be used.

Figure 14:
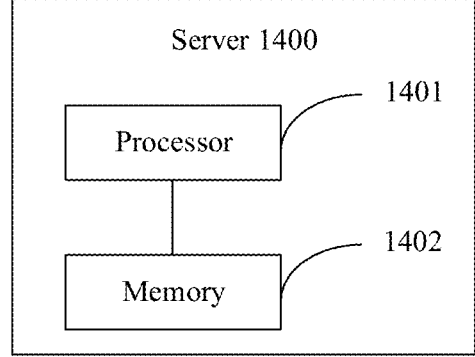
FIG. 14 is a schematic structural diagram of a server according to an embodiment of this application.

FIG. 14 is a schematic structural diagram of a server according to an embodiment of this application. The server 1400 may vary a lot due to different configurations or performance, and may include one or more processors 1401 and one or more memories 1402. The one or more memories 1402 stores at least one computer instruction. The at least one computer instruction is loaded and executed by the one or more processors 1401 to implement the 3D model rendering method provided in the foregoing method embodiments. For example, the processors 1401 are CPUs. Certainly, the server 1400 may further include components such as a wired or wireless network interface, a keyboard, and an input/output (I/O) interface, to facilitate input and output. The server 1400 may further include another component configured to implement a function of a device. Details are not described herein.

In an exemplary embodiment, a non-transitory computer-readable storage medium is further provided. The computer-readable storage medium stores at least one computer program. The at least one computer program is loaded and executed by a processor to cause an electronic device to implement any one of the 3D model rendering methods described above.

In some embodiments, the computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program or computer program product is further provided. The computer program or computer program product stores at least one computer program. The at least one computer program is loaded and executed by a processor to cause an electronic device to implement any one of the 3D model rendering methods described above.

In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A three-dimension (3D) model rendering method performed by an electronic device, and the method comprises:

acquiring a cross-section dataset of a 3D model of an object, wherein:

the object includes a plurality of components;

the 3D model includes a plurality of submodels and the cross-section dataset is constructed based on the plurality of submodels, wherein each submodel of the plurality of submodels represents a respective component of the object and the plurality of submodels include texture data representing texture information of the plurality of components of the object;

the cross-section dataset includes a plurality of pieces of cross-section data, each of the plurality of pieces of cross-section data in the cross-section dataset corresponding to a respective two-dimensional (2D) cross section of a three-dimensional (3D) bounding box of a respective submodel representing a respective component of the object;

acquiring a plurality of texture maps corresponding to the plurality of pieces of cross-section data in the cross-section dataset; and rendering the 3D model based on the plurality of pieces of cross-section data in the cross-section dataset and the plurality of texture maps.

2. The method according to claim 1, wherein:

a respective texture map, of the plurality of texture maps, corresponds to a respective piece of cross-section data in the cross-section dataset; and the respective texture map is obtained by projecting texture data of a submodel corresponding to the respective piece of cross-section data onto a cross section indicated by the respective piece of cross-section data.

3. The method according to claim 1, wherein the cross-section dataset comprises at least two hierarchical levels of datasets, including a lower hierarchical level of datasets and a higher hierarchical level of datasets, the dataset at each of the levels comprising at least one piece of cross-section data, and one piece of cross-section data at the higher level corresponding to at least one piece of cross-section data at the lower level.

4. The method according to claim 3, wherein acquiring the cross-section dataset further comprises:

determining a dataset at the higher level based on a dataset at the lower level, the dataset at the lower level being determined based on the cross-section data corresponding to the submodels in the 3D model in response to the lower level being the lowest level in the at least two levels; and obtaining the cross-section dataset based on the datasets at the at least two levels in response to satisfying a set condition.

5. The method according to claim 3, wherein rendering the 3D model based on the plurality of pieces of cross-section data in the cross-section dataset and the corresponding texture maps comprises:

for any piece of cross-section data at the higher level satisfying a first rendering condition and a second rendering condition, rendering the piece of cross-section data according to the texture map corresponding to the piece of cross-section data to obtain a rendering result of the piece of cross-section data; and in response to pieces of cross-section data at the higher level that satisfy the first rendering condition satisfying the second rendering condition, obtaining a rendering result of the 3D model based on the rendering results of the pieces of cross-section data.

6. The method according to claim 1, wherein the method further comprises:

determining a first submodel in the 3D model;

determining transformation information from the first submodel to a second submodel;

determining cross-section data corresponding to the first submodel; and determining cross-section data corresponding to the second submodel based on the cross-section data corresponding to the first submodel and the transformation information.

7. The method according to claim 1, wherein acquiring the plurality of texture maps corresponding to the plurality of pieces of cross-section data in the cross-section dataset further comprises:

projecting, for a submodel corresponding to a piece of cross-section data, texture data of the submodel onto a cross section indicated by the piece of cross-section data, to obtain a texture map of the submodel; and fusing texture maps of submodels corresponding to the piece of cross-section data to obtain the texture map corresponding to the piece of cross-section data.

8. An electronic device, comprising:

a processor; and memory, the memory storing at least one computer program, and the at least one computer program being loaded and executed by the processor to cause the electronic device to perform operations including:

acquiring a cross-section dataset of a 3D model of an object, wherein:

the object includes a plurality of components:

the 3D model includes a plurality of submodels and the cross-section dataset is constructed based on the plurality of submodels, wherein each submodel of the plurality of submodels represents a respective component of the object and the plurality of submodels include texture data representing texture information of the plurality of components of the object;

the cross-section dataset includes a plurality of pieces of cross-section data, each of the plurality of pieces of cross-section data in the cross-section dataset corresponding to a respective two-dimensional (2D) cross section of a three-dimensional (3D) bounding box of a respective submodel representing a respective component of the object;

acquiring a plurality of texture maps corresponding to the plurality of pieces of cross-section data in the cross-section dataset; and rendering the 3D model based on the plurality of pieces of cross-section data in the cross-section dataset and the plurality of texture maps.

9. The electronic device according to claim 8, wherein:

a respective texture map, of the plurality of texture maps, corresponds to a respective piece of cross-section data in the cross-section dataset; and the respective texture map is obtained by projecting texture data of a submodel corresponding to the respective piece of cross-section data onto a cross section indicated by the respective piece of cross-section data.

10. The electronic device according to claim 8, wherein the cross-section dataset comprises at least two hierarchical levels of datasets, including a lower hierarchical level of datasets and a higher hierarchical level of datasets, the dataset at each of the levels comprising at least one piece of cross-section data, and one piece of cross-section data at the higher level corresponding to at least one piece of cross-section data at the lower level.

11. The electronic device according to claim 10, wherein acquiring the cross-section dataset further comprises:

determining a dataset at the higher level based on a dataset at the lower level, the dataset at the lower level being determined based on the cross-section data corresponding to the submodels in the 3D model in response to the lower level being the lowest level in the at least two levels; and obtaining the cross-section dataset based on the datasets at the at least two levels in response to satisfying a set condition.

12. The electronic device according to claim 10, wherein rendering the 3D model based on the plurality of pieces of cross-section data in the cross-section dataset and the corresponding texture maps comprises:

for any piece of cross-section data at the higher level satisfying a first rendering condition and a second rendering condition, rendering the piece of cross-section data according to the texture map corresponding to the piece of cross-section data to obtain a rendering result of the piece of cross-section data; and in response to pieces of cross-section data at the higher level that satisfy the first rendering condition satisfying the second rendering condition, obtaining a rendering result of the 3D model based on the rendering results of the pieces of cross-section data.

13. The electronic device according to claim 8, wherein the operations further include:

determining a first submodel in the 3D model;

determining transformation information from the first submodel to a second submodel;

determining cross-section data corresponding to the first submodel; and determining cross-section data corresponding to the second submodel based on the cross-section data corresponding to the first submodel and the transformation information.

14. The electronic device according to claim 8, wherein acquiring the plurality of texture maps corresponding to the plurality of pieces of cross-section data in the cross-section dataset further comprises:

projecting, for a submodel corresponding to a piece of cross-section data, texture data of the submodel onto a cross section indicated by the piece of cross-section data, to obtain a texture map of the submodel; and fusing texture maps of submodels corresponding to the piece of cross-section data to obtain the texture map corresponding to the piece of cross-section data.

15. A non-transitory computer-readable storage medium, storing at least one computer program, the at least one computer program being loaded and executed by a processor of an electronic device to cause the electronic device to perform operations including:

acquiring a cross-section dataset of a 3D model of an object, wherein:

the object includes a plurality of components;

the 3D model includes a plurality of submodels and the cross-section dataset is constructed based on the plurality of submodels, wherein each submodel of the plurality of submodels represents a respective component of the object and the plurality of submodels include texture data representing texture information of the plurality of components of the object;

the cross-section dataset includes a plurality of pieces of cross-section data, each of the plurality of pieces of cross-section data in the cross-section dataset corresponding to a respective two-dimensional (2D) cross section of a three-dimensional (3D) bounding box of a respective submodel representing a respective component of the object;

acquiring a plurality of texture maps corresponding to the plurality of pieces of cross-section data in the cross-section dataset; and rendering the 3D model based on the plurality of pieces of cross-section data in the cross-section dataset and the plurality of texture maps.

16. The non-transitory computer-readable storage medium according to claim 15, wherein:

a respective texture map, of the plurality of texture maps, corresponds to a respective piece of cross-section data in the cross-section dataset; and the respective texture map is obtained by projecting texture data of a submodel corresponding to the respective piece of cross-section data onto a cross section indicated by the respective piece of cross-section data.

17. The non-transitory computer-readable storage medium according to claim 15, wherein the cross-section dataset comprises at least two hierarchical levels of datasets, including a lower hierarchical level of datasets and a higher hierarchical level of datasets, the dataset at each of the levels comprising at least one piece of cross-section data, and one piece of cross-section data at the higher level corresponding to at least one piece of cross-section data at the lower level.

18. The non-transitory computer-readable storage medium according to claim 17, wherein rendering the 3D model based on the plurality of pieces of cross-section data in the cross-section dataset and the corresponding texture maps comprises:

for any piece of cross-section data at the higher level satisfying a first rendering condition and a second rendering condition, rendering the piece of cross-section data according to the texture map corresponding to the piece of cross-section data to obtain a rendering result of the piece of cross-section data; and in response to pieces of cross-section data at the higher level that satisfy the first rendering condition satisfying the second rendering condition, obtaining a rendering result of the 3D model based on the rendering results of the pieces of cross-section data.

19. The non-transitory computer-readable storage medium according to claim 15, wherein the operations further include:

determining a first submodel in the 3D model;

determining transformation information from the first submodel to a second submodel;

determining cross-section data corresponding to the first submodel; and determining cross-section data corresponding to the second submodel based on the cross-section data corresponding to the first submodel and the transformation information.

20. The non-transitory computer-readable storage medium according to claim 15, wherein acquiring the plurality of texture maps corresponding to the plurality of pieces of cross-section data in the cross-section dataset further comprises:

projecting, for a submodel corresponding to a piece of cross-section data, texture data of the submodel onto a cross section indicated by the piece of cross-section data, to obtain a texture map of the submodel; and fusing texture maps of submodels corresponding to the piece of cross-section data to obtain the texture map corresponding to the piece of cross-section data.

* * * * *